United States Patent
Koyanagi et al.

(10) Patent No.: US 10,182,423 B2
(45) Date of Patent: *Jan. 15, 2019

(54) RESOURCE ALLOCATION METHOD, IDENTIFICATION METHOD, BASE STATION, MOBILE STATION, AND PROGRAM

(71) Applicants: Kenji Koyanagi, Tokyo (JP); Takamichi Inoue, Tokyo (JP); Le Liu, Tokyo (JP); Yoshikazu Kakura, Tokyo (JP)

(72) Inventors: Kenji Koyanagi, Tokyo (JP); Takamichi Inoue, Tokyo (JP); Le Liu, Tokyo (JP); Yoshikazu Kakura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,946

(22) Filed: Jun. 15, 2017

(65) Prior Publication Data

US 2017/0289996 A1    Oct. 5, 2017

Related U.S. Application Data

(63) Continuation of application No. 15/172,447, filed on Jun. 3, 2016, now Pat. No. 9,713,130, which is a
(Continued)

(30) Foreign Application Priority Data

Jun. 20, 2008    (JP) .................................. 2008-161753

(51) Int. Cl.
*H04W 72/04* (2009.01)
*H04L 5/00* (2006.01)
*H04W 28/06* (2009.01)

(52) U.S. Cl.
CPC ....... *H04W 72/0413* (2013.01); *H04L 5/0039* (2013.01); *H04L 5/0094* (2013.01);
(Continued)

(58) Field of Classification Search
None
See application file for complete search history.

(56) References Cited

U.S. PATENT DOCUMENTS 7,016,319 B2    3/2006    Baum et al.
7,738,418 B2    6/2010    Kwon et al.
(Continued)

FOREIGN PATENT DOCUMENTS

CN    101064903 A    10/2007
CN    101119277 A    2/2008

OTHER PUBLICATIONS

Communication dated Sep. 20, 2017 from the European Patent Office in counterpart European application No. 17184819.5.
(Continued)

*Primary Examiner* — Hong Cho
(74) *Attorney, Agent, or Firm* — Sughrue Mion, PLLC

(57) ABSTRACT

Provided is a technique capable of reporting resource block allocation information with no waste when an allocated resource block is reported, because in the current LTE downlink, the waste of the amount of resource allocation information increases in some cases since a restriction is imposed such that 37-bit fixed scheduling information is transmitted. A resource block group consisting of at least one or more resource blocks continuous on the frequency axis is allocated to a terminal, and the number of controlling signals for reporting allocation information indicating the allocated resource blocks is determined.

24 Claims, 18 Drawing Sheets

Related U.S. Application Data continuation of application No. 13/000,265, filed as application No. PCT/JP2009/061195 on Jun. 19, 2009, now Pat. No. 9,386,574.

(52) U.S. Cl.
CPC ..... *H04W 72/042* (2013.01); *H04W 72/0453* (2013.01); *H04W 28/06* (2013.01)

(56) References Cited

U.S. PATENT DOCUMENTS

| | | |
|---|---|---|
| 8,072,920 B2 | 12/2011 | Heo et al. |
| 2007/0160160 A1 | 7/2007 | Kakura |
| 2008/0049668 A1 | 2/2008 | Kakura et al. |
| 2008/0049813 A1 | 2/2008 | Kurose et al. |
| 2008/0080560 A1 | 4/2008 | Inoue et al. |
| 2008/0101214 A1 | 5/2008 | Jitsukawa et al. |
| 2008/0117867 A1 | 5/2008 | Yin et al. |
| 2008/0152029 A1 | 6/2008 | Kwon et al. |
| 2008/0233992 A1 | 9/2008 | Oteri et al. |
| 2008/0273479 A1 | 11/2008 | Kwak et al. |
| 2009/0110087 A1 | 4/2009 | Liu et al. |
| 2009/0325585 A1 | 12/2009 | Farajidana et al. |
| 2011/0110322 A1 | 5/2011 | Koyanagi et al. |
| 2011/0113433 A1 | 5/2011 | Koyanagi et al. |
| 2016/0234817 A1 | 8/2016 | Koyanagi et al. |
| 2016/0286546 A1 | 9/2016 | Koyanagi et al. |
| 2017/0230949 A1 | 8/2017 | Koyanagi et al. |

OTHER PUBLICATIONS

LG Electronics, "Downlink resource allocation for localized and distributed transmission", 3GPP Draft, R1-071549, DL Resource Allocation, Mobile Competence Centre, 3GPP TSG RAN WG1 #48bis, Mar. 26-30, 2007, pp. 1-3 (3 pages).

Mitsubishi Electric, "Further Study of Resource Allocation in Downlink", 3GPP Draft, R1-074552_RBASSIGN, Mobile Competence Centre, 3GPP TSG RAN WG1 #51, Nov. 5-9, 2007, pp. 1-8 (8 pages).

NEC Group, "DL Unicast Resource Allocation Signalling using L1L2 control channels", 3GPP Draft, R1-074162, Mobile Competence Centre, TSG-RAN WG1#50Bis, Oct. 8-12, 2007, pp. 1-4 (4 pages).

NEC Group and NTT DoCoMo, "Uplink Resource Allocation for E-ULTRA," Feb. 12, 2007, pp. 1-4, R1-070881, TSG-RAN WG1#48, St. Louis, Missouri, USA.

NEC Group and NTT DoCoMo, "Uplink Resource Allocation for E-ULTRA," Aug. 20, 2007, pp. 1-5, R1-073457, TSG-RAN WG1#50, Athens, Greece.

NEC Group, "DL Unicast Resource Allocation Signalling using L1L2 control channels," Jun. 25, 2007, pp. 1-6, R1-072832, TSG-RAN WG1 #49Bis, Orlando, USA.

NEC Group, DL Unicast Resource Allocation Signalling using L1L2 control channels, Nov. 5, 2007, pp. 1-4, R1-075055, TSG-RAN WG1 #51, Jeju, South Korea.

3GPP R1-070881 NEC Group, NTT DoCoMo "Uplink Resource Allocation for E-UTRA", Feb. 2007.

Counterpart Extended European Search Report dated Jul. 25, 2014 in corresponding European Application No. 09766719.0.

Ericsson: "Begin—end representation of scheduling allocations", 3GPP Draft; R1-073052, 3rd Generation Partnership Project (3GPP), vol. RAN WG1, Jun. 20, 2007, 2 total pages.

NEC Group and NTT DoCoMo, Uplink Resource Allocation for E-UTRA, R1-073457, TSG-RAN WG1 #50, Aug. 20, 2007.

NEC Group, DL Unicast Resource Allocation Signalling using L1L2 control channels, R1-072832, TSG-RAN WG1 #49bis, Jun. 25, 2007.

NEC Group, DL Unicast Resource Allocation Signalling using L1L2 control channels, R1-075055, TSG-RAN WG1 #51, Nov. 5, 2007.

NEC Group: "DL Unicast Resource Allocation Signalling using L1L2 control channels", 3GPP Draft; R1-074715, 3rd Generation Partnership Project (3GPP), vol. RAN WG1, Oct. 30, 2007, 4 total pages.

Office action dated Apr. 9, 2013 issued by the State Intellectual Property Office in corresponding Chinese Patent Application No. 200980123258.8.

Office Action dated Feb. 25, 2014, issued by the Patent Office of the P.R.C. in corresponding Chinese Application No. 200980123258.8.

3GPP TS 36.212 V8.3.0 (May 2008) Technical Specification Group Radio Access Network; Evolved Universal Terrestrial Radio Access (E-UTRA); Multiplexing and channel coding (Release 8).

3GPP TS 36.213 V8.3.0 (May 2008) Technical Specification Group Radio Access Network; Evolved Universal Terrestrial Radio Access (E-UTRA); Physical layer procedures (Release 8).

3GPP TSG RAN1#53, Kansas City, MO, USA, May 5-9, 2008, R1-081752: Proposals on PHY related aspects in LTE Advanced Agenda item: 6.2.

3GPP TSG RAN WG1#53, Kansas City, MO, USA, May 5-9, 2008, R1-081838: 6.2 Discussion on Physical Layer Aspects LTE-Advanced Proposals, Physical layer technologies for LTE-Advanced.

3GPP TSG RAN WG1#53, Kansas City, MO, USA, May 5-9, 2008, R1-081842: LTE-A—Requirements, Agenda Item 6.2: LTE-A Proposals for evolution; Source: Nokia Siemens Networks, Nokia.

| FREQUENCY BLOCK | 1 | 2 | 3 |
|---|---|---|---|
| ALLOCATION RESOLUTION | 1RB | 1RB | 2RBS |

FIG. 18
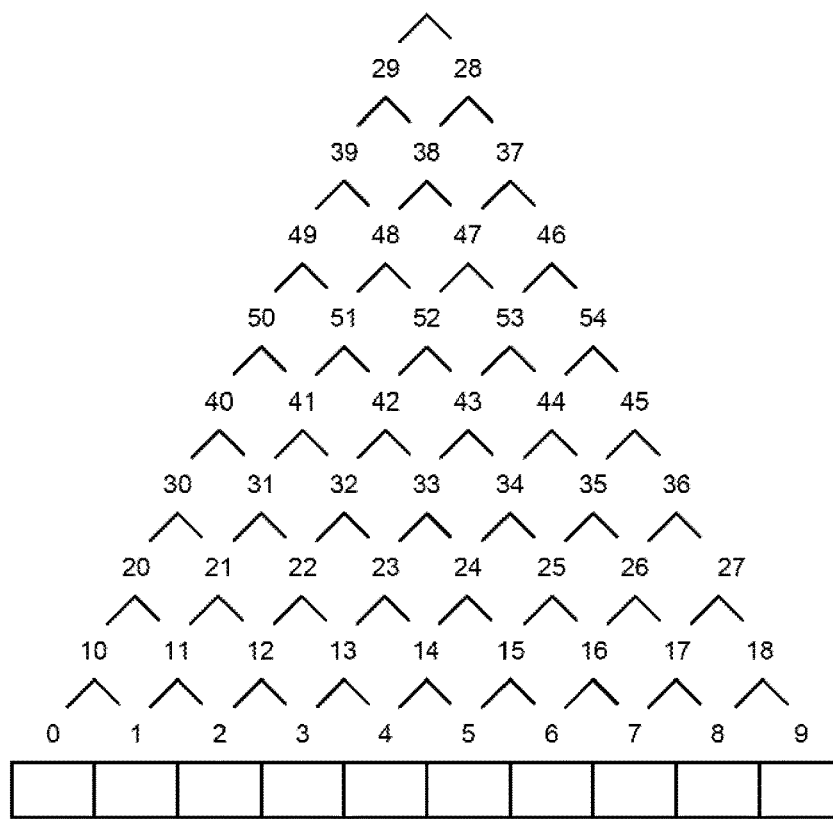
WHEN ALLOCATION RESOLUTION IS 1 RB
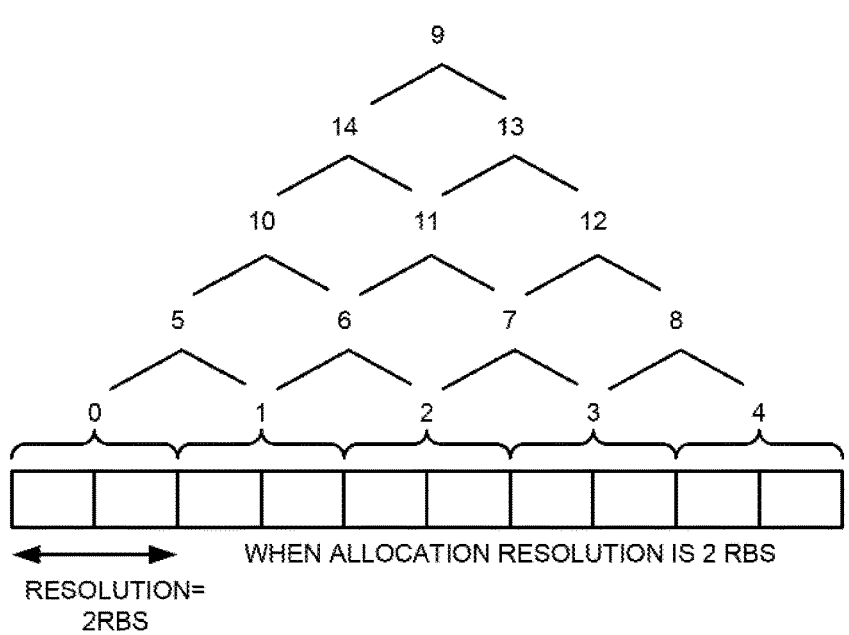
WHEN ALLOCATION RESOLUTION IS 2 RBS
RESOLUTION= 2RBS

FIG. 20

| DF (FREQUENCY BLOCK) | 1 | 2 | 3 | 4 |
|---|---|---|---|---|
| ALLOCATION RESOLUTION | 1RB | 1RB | 2RBS | 5RBS |
| NUMBER OF BITS OF INFORMATION REQUIRED FOR NOTIFICATION PER FREQUENCY BLOCK ACCORDING TO TREE-BASED METHOD | 13 | 13 | 11 | 8 |
| NUMBER OF BITS OF INFORMATION REQUIRED FOR NOTIFICATION OF MAXIMUM OF DF FREQUENCY BLOCKS ACCORDING TO TREE-BASED METHOD | 15(=13x1+2) | 28(=13x2+2) | 35(11x3+2) | 34(8x4+2) |

RESOURCE ALLOCATION METHOD, IDENTIFICATION METHOD, BASE STATION, MOBILE STATION, AND PROGRAM

CROSS REFERENCE TO RELATED APPLICATIONS

This is a Continuation Application of U.S. patent application Ser. No. 15/172,447, filed Jun. 3, 2016, in the U.S. Patent and Trademark Office, which is a Continuation of application Ser. No. 13/000,265, filed Dec. 20, 2010, which is a 371 of International Application No. PCT/JP2009/061195 filed Jun. 19, 2009, which claims priority from Japanese Patent Application No. 2008-161753 filed Jun. 20, 2008, the contents of all of which are incorporated herein by reference in their entirety.

TECHNICAL FIELD

The present invention relates to a technique for mobile wireless systems, and particularly, to a technique for resource allocation.

BACKGROUND ART

For uplink according to LTE (Long Term Evolution) in 3GPP (3$^{rd}$ Generation Partnership Project), an SC (single-carrier)-FDMA (Frequency Division Multiple Access) scheme is adopted for a wireless access scheme to avoid an increase in PAPR (Peak to Average Power Ratio) and achieve wide coverage. According to SC-FDMA, one frequency block can be allocated per mobile station within one Transmit Time Interval (TTI), where a frequency block is composed of at least one or more resource blocks (RBs: each composed of a plurality of sub-carriers) that are consecutive on a frequency axis. For a small number of frequency blocks as in SC-FDMA, a Tree-Based (see Non-patent Document 1) method can minimize the amount of information on resource allocation. Accordingly, the Tree-Based method is employed in notification of uplink resource allocation information (Uplink Scheduling Grant) in scheduling for LTE uplink.
Non-patent Document 1: 3GPP R1-070881, NEC Group, NTT DoCoMo, "Uplink Resource Allocation for E-UTRA," February 2007.

DISCLOSURE OF THE INVENTION

Problems to be Solved by the Invention

On the other hand, in OFDM (Orthogonal Frequency Division Multiplexing) adopted in an LTE downlink access scheme, discontinuous sub-carrier allocation is made to increase the number of frequency blocks and an additional multi-diversity effect can be achieved to improve throughput. In OFDM, adoption of a Bit Map method (a method suitable for a larger number of frequency blocks) is currently being studied in notification of resource block allocation information in LTE downlink (Downlink Scheduling Grant). The Bit Map method has a greater overhead than in the Tree-Based method used in notification of LTE uplink RB allocation information (Uplink Scheduling Grant).

In particular, when using the Bit Map method, resource block allocation of 100 RBs requires 100-bit resource block allocation information regardless of the number of frequency blocks. On the other hand, when using the Tree-Based method, Scheduling Grant having $\log_2 100 (100+1)/2=13$ bits is notified for one frequency block via PDCCH (Physical Downlink Control Channel), which is a downlink control signal, from a base station to a mobile station.

In Uplink Scheduling Grant according to current LTE, it is possible to notify allocation information on only one frequency block. In LTE downlink, limitation is posed on a resource block to be allocated and resource block allocation information of 37 bits at maximum can be transmitted; when resource block allocation information has a size within 37 bits, dummy data is inserted. Thus, it is necessary to always reserve a resource such that information of 37 bits can be transmitted in one piece of Uplink Scheduling Grant. However, for example, in a case that two frequency blocks are allocated among 100 RBs to a terminal, and resource block allocation information, which is information representing the allocation, is to be transmitted in accordance with the Tree Based method, only 13 bits×2=26 bits are required; however, dummy data of 11 bits is inserted for notification, which is inefficient. Thus, in some cases, the amount of useless resource allocation information may be increased.

It is therefore a problem to be solved by the present invention is to provide a technique capable of, in notifying an allocated resource block, notifying resource block allocation information without inefficiency.

Means for Solving the Problems

The present invention for solving the aforementioned problem is a resource allocation method, characterized in comprising: allocating resource block groups including at least one or more resource blocks consecutive on a frequency axis to a terminal; and determining a number of control signals for notifying allocation information representing resource blocks in said allocated resource block groups.

The present invention for solving the aforementioned problem is a communication method of allocating resource block groups including at least one or more resource blocks consecutive on a frequency axis, characterized in comprising identifying resource blocks allocated to a mobile station from information on allocated resource block groups notified using a determined number of control signals.

The present invention for solving the aforementioned problem is a wireless system, characterized in comprising: allocating means for allocating resource block groups including at least one or more resource blocks consecutive on a frequency axis to a terminal; and determining means for determining a number of control signals for notifying allocation information representing resource blocks in said allocated resource block groups.

The present invention for solving the aforementioned problem is a wireless system for allocating resource block groups including at least one or more resource blocks consecutive on a frequency axis, characterized in comprising identifying means for identifying resource blocks allocated to a mobile station from information on allocated resource block groups notified using a determined number of control signals.

The present invention for solving the aforementioned problem is a base station, characterized in comprising: allocating means for allocating resource block groups including at least one or more resource blocks consecutive on a frequency axis to a terminal; and determining means for determining a number of control signals for notifying allocation information representing resource blocks in said allocated resource block groups.

The present invention for solving the aforementioned problem is a mobile station for identifying allocation of resource block groups including at least one or more resource blocks consecutive on a frequency axis, characterized in comprising identifying means for identifying resource blocks allocated to the mobile station from information on allocated resource block groups notified using a determined number of control signals.

The present invention for solving the aforementioned problem is a program for a base station, said program being characterized in causing said base station to execute: allocating processing of allocating resource block groups including at least one or more resource blocks consecutive on a frequency axis to a terminal; and determining processing of determining a number of control signals for notifying allocation information representing resource blocks in said allocated resource block groups.

The present invention for solving the aforementioned problem is a program for a mobile station for identifying allocation of resource block groups including at least one or more resource blocks consecutive on a frequency axis, said program being characterized in causing said mobile station to execute identifying processing of identifying resource blocks allocated to the mobile station from information on allocated resource block groups notified using a determined number of control signals.

Effects of the Invention

According to the present invention, inefficiency in resources encountered in notifying allocation information can be reduced.

BRIEF DESCRIPTION OF THE DRAWINGS

FIG. 18 A diagram for explaining the Tree-Based method modified in accordance with an allocation resolution.
FIG. 20 A diagram showing the number of bits of resource allocation information with respect to the maximum frequency blocks and an allocation resolution.

EXPLANATION OF SYMBOLS

Figure 1:
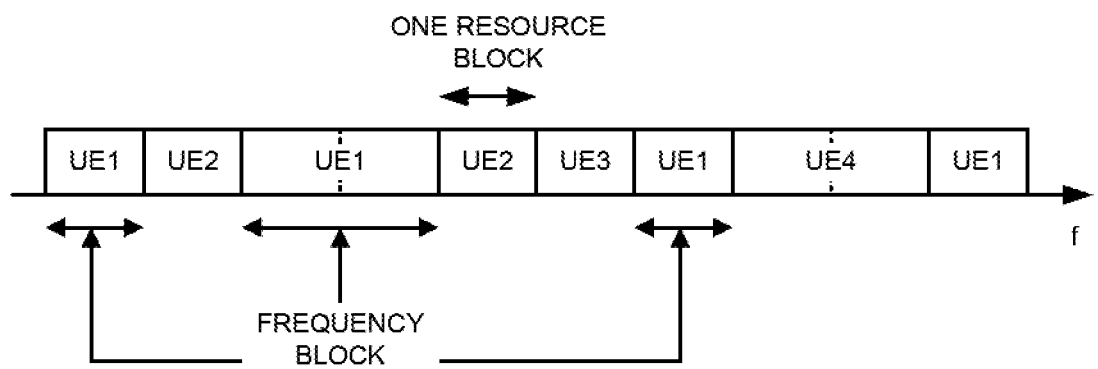
FIG. 1 A diagram for explaining frequency blocks.

100 Base station
101 Receiver
102 Uplink RS separator
103 Uplink CQI measurement section
104 Uplink scheduler
105 Maximum-number-of-frequency-blocks determining section
106 Uplink data signal separator
107 Uplink data signal demodulator
108 Uplink control signal separator
109 Uplink control signal demodulator
110 Downlink scheduler
111 Downlink control signal generator
112 Downlink RS signal generator
113 Downlink data signal generator
114 Multiplexer
115 Transmitter
116 UE ID generator
200 Mobile station
201 Receiver
202 Downlink RS separator
203 Downlink CQI measurement section
204 Downlink data signal separator
205 Downlink data signal demodulator
206 Downlink control signal separator
207 Downlink control signal demodulator
208 Downlink scheduling information extracting section
209 Maximum-number-of-frequency-blocks extracting section
210 Uplink scheduling information extracting section
211 Uplink control signal generator
212 Uplink RS signal generator
213 Uplink data signal generator
214 Multiplexer
215 Transmitter

BEST MODES FOR CARRYING OUT THE INVENTION

According to Long Term Evolution (LTE) being currently standardized in the $3^{rd}$ Generation Partnership Project (3GPP), Orthogonal Frequency Division Multiplexing (OFDM) is adopted for a downlink access scheme. The frequency domain channel dependent scheduling is applied to LTE downlink, and a plurality of frequency blocks can be allocated per mobile station within one Transmit Time Interval (TTI), where a frequency block is a resource block group composed of at least one or more resource blocks (RBs: each of which is composed of a plurality of subcarriers) that are consecutive on a frequency axis. FIG. 1 shows an example of frequency block allocation in LTE downlink. This represents a case in which four mobile stations are scheduled within one TTI in a system band. The number of frequency blocks for mobile station 1 (UE1) is three, the number of frequency blocks for mobile station 2 (UE2) is two, the frequency block for mobile station 3 (UE3) counts one, and the frequency block for mobile station 4 (UE4) counts one.

The present invention is characterized in determining a number of pieces of scheduling information (Uplink Scheduling Grant), which is information on resource blocks allocated to terminals by a base station for allocating a plurality of frequency blocks to one mobile station as described above, and a number of control signals PDCCH's (Physical Downlink Control Channels) for notifying the scheduling information to terminals, or a number of bits thereof. Now details of the present invention will be described below with reference to the accompanying drawings.

First Embodiment

Figure 2:
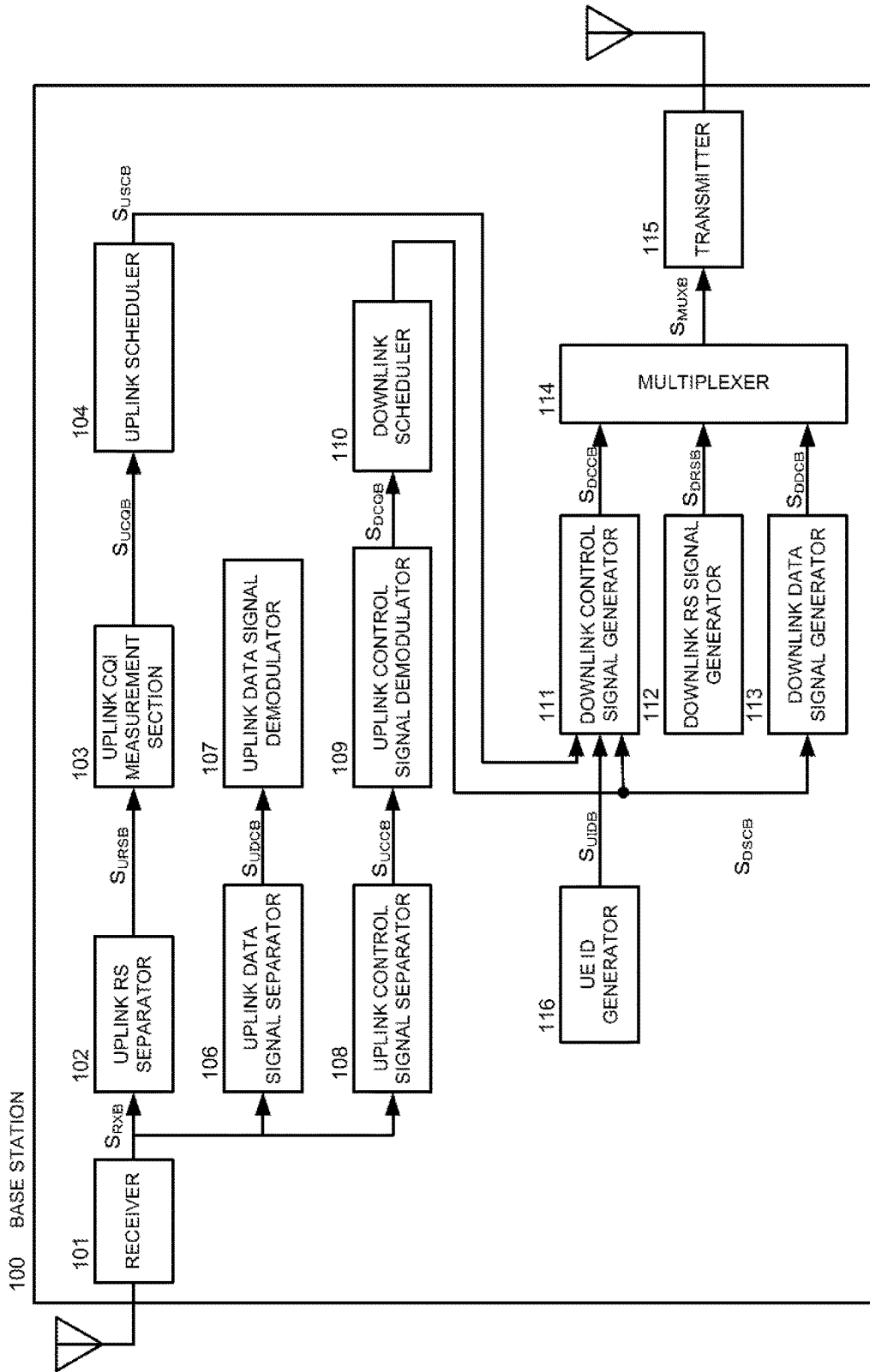
FIG. 2 A block diagram of a base station in a wireless communication system in a first embodiment.
Figure 3:
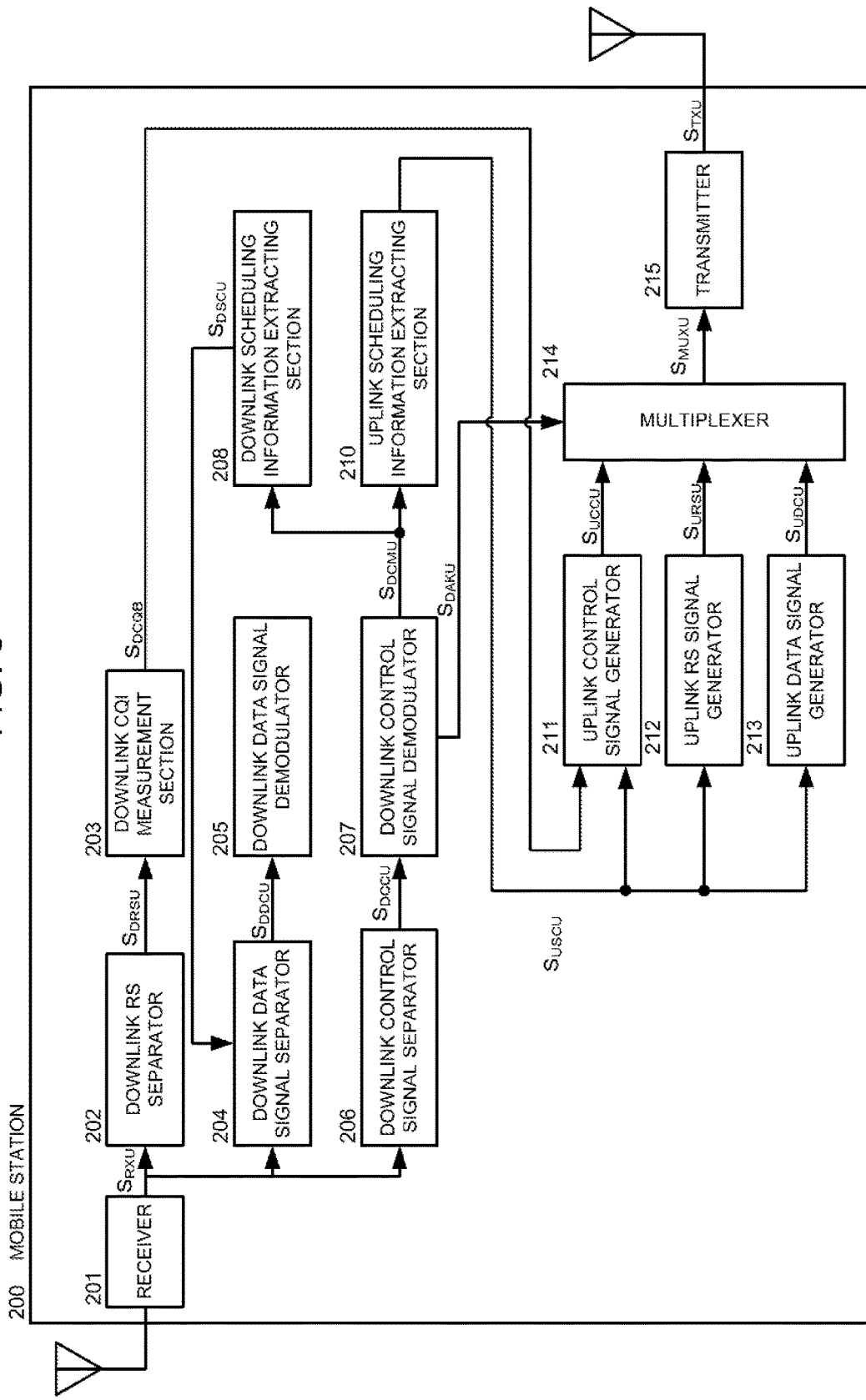
FIG. 3 A block diagram of a mobile station in the wireless communication system in the first embodiment.

A block diagram of a base station in this embodiment is shown in FIG. 2, and that of a mobile station in FIG. 3.

First, a configuration of a base station 100 will be described.

A receiver 101 in the base station 100 receives a signal from a mobile station 200, establishes uplink synchronization using a guard interval, and outputs a base station receive signal $S_{RXB}$.

An uplink RS (Reference Signal) separator 102 separates from the base station receive signal $S_{RXB}$ an uplink RS signal $S_{URSB}$ in which uplink RS signals of a plurality of mobile stations are multiplexed, and outputs it.

An uplink CQI measurement section 103 receives the uplink RS signals $S_{URSB}$ for a plurality of mobile stations as input, calculates CQI (Channel Quality Indicator) for each mobile station on an RB-by-RB basis, and outputs it as uplink CQI information $S_{UCQB}$.

An uplink scheduler 104 makes uplink scheduling and resource allocation to a mobile station. The uplink scheduler 104 determines a number of frequency blocks to be allocated to one terminal based on the uplink CQI information $S_{UCQB}$. In particular, it increases the number of frequency blocks for good CQI, and decreases the number for poor CQI. It allocates resource blocks one by one so that the determined number of frequency blocks is attained. It then generates resource allocation information representing positions of allocated RBs in accordance with the Tree Based method for each frequency block, and outputs it as UL Scheduling Grant $S_{USCB}$. That is, a number of pieces of UL Scheduling Grant $S_{USCB}$, which number is equal to the number of frequency blocks for one user, are generated. In allocating 100 RBs, the uplink scheduler 104 generates 13-bit UL Scheduling Grant. While a configuration for generating a number of pieces of UL Scheduling Grant, which number is equal to the number of frequency blocks, will be described hereinbelow, other configurations may be employed. For example, a configuration in which allocation information on a plurality of frequency blocks is written in one piece of UL Scheduling Grant to reduce the number of pieces of UL Scheduling Grant relative to the number of frequency blocks may be contemplated.

A downlink control signal generator 111 receives the UL Scheduling Grant $S_{USCB}$, mobile station identification signal $S_{UIDB}$ and DL Scheduling Grant $S_{DSCB}$ as input, multiplexes the mobile station identification signal $S_{UIDB}$ with each of the plurality of pieces of UL Scheduling Grant and DL Scheduling Grant $S_{DSCB}$, generates a downlink control signal PDCCH $S_{DCCB}$ from each of the plurality of pieces of UL Scheduling Grant, and moreover, generates a downlink control signal PDCCH $S_{DCCB}$ from the DL Scheduling Grant. The downlink control signals PDCCH's $S_{DCCB}$ are generated as the downlink control signal PDCCH $S_{DCCB}$ for the UL Scheduling Grant $S_{USCB}$ and that for the DL Scheduling Grant $S_{DSCB}$. In other words, the downlink control signals PDCCH's $S_{DCCB}$ are generated in a number equal to the sum of the number of pieces of Scheduling Grant including the UL Scheduling Grant $S_{USCB}$ and DL Scheduling Grant $S_{DSCB}$. The downlink control signal PDCCH $S_{DCCB}$ is multiplexed with information bits indicating a DCI (Downlink Control Information) format, which is an identifier for distinguishing between the UL Scheduling Grant and DL Scheduling Grant. For example, a DCI format of zero is multiplexed for UL Scheduling Grant and of one for DL Scheduling Grant in the downlink control signal PDCCH $S_{DCCB}$.

A downlink RS signal generator 112 generates a downlink RS signal and outputs it as a downlink RS signal $S_{DRSB}$.

A downlink data signal generator 113 receives the DL Scheduling Grant $S_{DSCB}$ as input, multiplexes downlink data signals from a plurality of mobile stations in accordance with an RB pattern indicated by the DL Scheduling Grant $S_{DSCB}$, generates Physical Downlink Shared Channel (PDSCH) $S_{DDCB}$, and outputs it.

A multiplexer 114 receives the PDCCH $S_{DCCB}$, RS signal $S_{DRSB}$ and PDSCH $S_{DDCB}$ as input, multiplexes these signals to generate a multiplexed downlink signal $S_{MUXB}$, and outputs it.

A transmitter 115 receives the multiplexed downlink signal $S_{MUXB}$ as input, generates a transmit signal $S_{TXB}$, and outputs it.

An uplink data signal separator 106 receives the base station receive signal $S_{RXB}$ as input, extracts therefrom Physical Uplink Shared Channel (PUSCH) $S_{UDCB}$ in which uplink data signals from a plurality of mobile stations are multiplexed, and outputs it. An uplink data signal demodulator is supplied with the PUSCH $S_{UDCB}$ as input, and demodulates it to reproduce mobile station transmitted data.

An uplink control signal separator 108 receives the base station receive signal $S_{RXB}$ as input, extracts therefrom Physical Uplink Control Channel (PUCCH) $S_{UCCB}$ in which uplink control signals from a plurality of mobile stations are multiplexed, and outputs it. An uplink control signal demodulator 109 demodulates the PUCCH $S_{UCCB}$, and outputs a downlink CQI measurement signal $S_{DCQB}$, which is a result of measurement of downlink CQI transmitted by a plurality of mobile stations. A downlink scheduler 110 receives the downlink CQI measurement signal $S_{DCQB}$ as input, makes downlink scheduling for a plurality of mobile stations, generates DL Scheduling Grant $S_{DSCB}$, which represents information on allocated RBs, and outputs it.

A UE ID generator 116 generates mobile station identification information $S_{UIDB}$, and outputs it.

Subsequently, a mobile station will be described. FIG. 3 is a block diagram showing a main configuration of a mobile station in this embodiment.

A receiver 201 in a mobile station 200 receives a signal from the base station 100, establishes downlink synchronization using a guard interval, and outputs a mobile station receive signal $S_{RXU}$.

A downlink RS (Reference Signal) separator 202 receives the mobile station receive signal $S_{RXU}$ as input, separates therefrom a downlink RS signal $S_{DRSU}$ in which downlink RS signals are multiplexed, and outputs it. A downlink CQI measurement section 203 receives the downlink RS signal $S_{DRSU}$ as input, calculates CQI on an RB-by-RB basis, and outputs it as downlink CQI information $S_{DCQB}$.

A downlink control signal separator 206 receives the mobile station receive signal $S_{RXU}$ as input, separates therefrom PDCCH $S_{DCCU}$ in which downlink control signals from a plurality of mobile stations are multiplexed, and outputs it.

A downlink control signal demodulator 207 receives the PDCCH $S_{DCCU}$ as input, demodulates it to reproduce a downlink control signal, separates therefrom all of results of reproduction in which the mobile station identification information corresponding to the mobile station itself is multiplexed, and outputs it as a reproduced downlink control signal $S_{DCMU}$. It should be noted that the PDCCH's for the mobile station itself are multiplexed in a number equal to the number of frequency blocks. The downlink control signal demodulator 207 also checks a result of demodulation of the PDCCH $S_{DCCU}$ and reproduction of the downlink control signal as to whether there is found an error in all downlink control signals destined to the mobile station itself, in a case that no error is found in any PDCCH, generates a signal indicating ACK as a downlink control signal decision signal $S_{DAKU}$, or in a case that any error is found there, similarly generates a signal indicating NACK, and outputs it. It should be noted that the downlink control signal decision signal $S_{DAKU}$ is notified from the mobile station 200 to the base station 100, and in a case that the downlink control signal decision signal $S_{DAKU}$ is NACK, the base station 100 retransmits all downlink control signals corresponding to the mobile station 200. While one downlink control signal decision signal $S_{DAKU}$ is generated for all PDCCH'S transmitted to one user, it may be contemplated to generate respective downlink control signal decision signals $S_{DAKU}$ for the PDCCH's. In a case that a downlink control signal decision signal $S_{DAKU}$ is generated for each PDCCH, the base station 100 can retransmit an erroneous PDCCH.

A downlink scheduling information extracting section 208 receives the reproduced downlink control signal $S_{DCMU}$ as input, and extracts information bearing "1" in its DCI format, that is, extracts downlink resource allocation information DL Scheduling Grant. It then identifies an RB represented by the downlink RB allocation information contained in the DL Scheduling Grant, and outputs it as downlink RB allocation decision information $S_{DSCU}$.

An uplink scheduling information extracting section 210 extracts, from the reproduced downlink control signal $S_{DCMU}$, information bearing "0" in its DCI format, that is, extracts UL Scheduling Grant representing information on allocated uplink RBs. Next, it identifies an RB represented by the uplink RB allocation information contained in the UL Scheduling Grant, and outputs it as uplink RB allocation decision information $S_{USCU}$.

An uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it.

An uplink RS signal generator 212 receives the uplink RB allocation decision information $S_{USCU}$ as input, generates an uplink RS transmit signal $S_{URSU}$ using a resource for RS predetermined in the uplink RB allocation decision information $S_{USCU}$, and outputs it.

An uplink data signal generator 213 receives the uplink RB allocation decision information $S_{USCU}$ as input, generates Physical Uplink Shared Channel (PUSCH) $S_{UDCU}$ using a resource for a data signal predetermined in the uplink RB allocation decision information $S_{USCU}$, and outputs it.

A multiplexer 214 receives the PUCCH $S_{UCCU}$, uplink RS transmit signal $S_{URSU}$, PUSCH $S_{UDCU}$ and downlink control signal decision signal $S_{DAKU}$ as input, multiplexes these signals to generate a multiplexed mobile station signal $S_{MUXU}$, and outputs it. A transmitter 215 receives the multiplexed mobile station signal $S_{MUXU}$ as input, generates a mobile station transmit signal $S_{TXU}$, and transmits it to the base station 100.

A downlink data signal separator 204 receives the downlink RB allocation receive signal $S_{DSCU}$ and mobile station receive signal $S_{RXU}$ as input, separates therefrom PDSCH $S_{DDCU}$ multiplexed with the downlink RB allocated to the mobile station itself based on the downlink RB allocation decision information $S_{DSCU}$, and outputs it. A downlink data signal demodulator 205 receives the PDSCH $S_{DDCU}$ as input, demodulates it to reproduce transmitted data from the base station to the mobile station itself.

Figure 4:
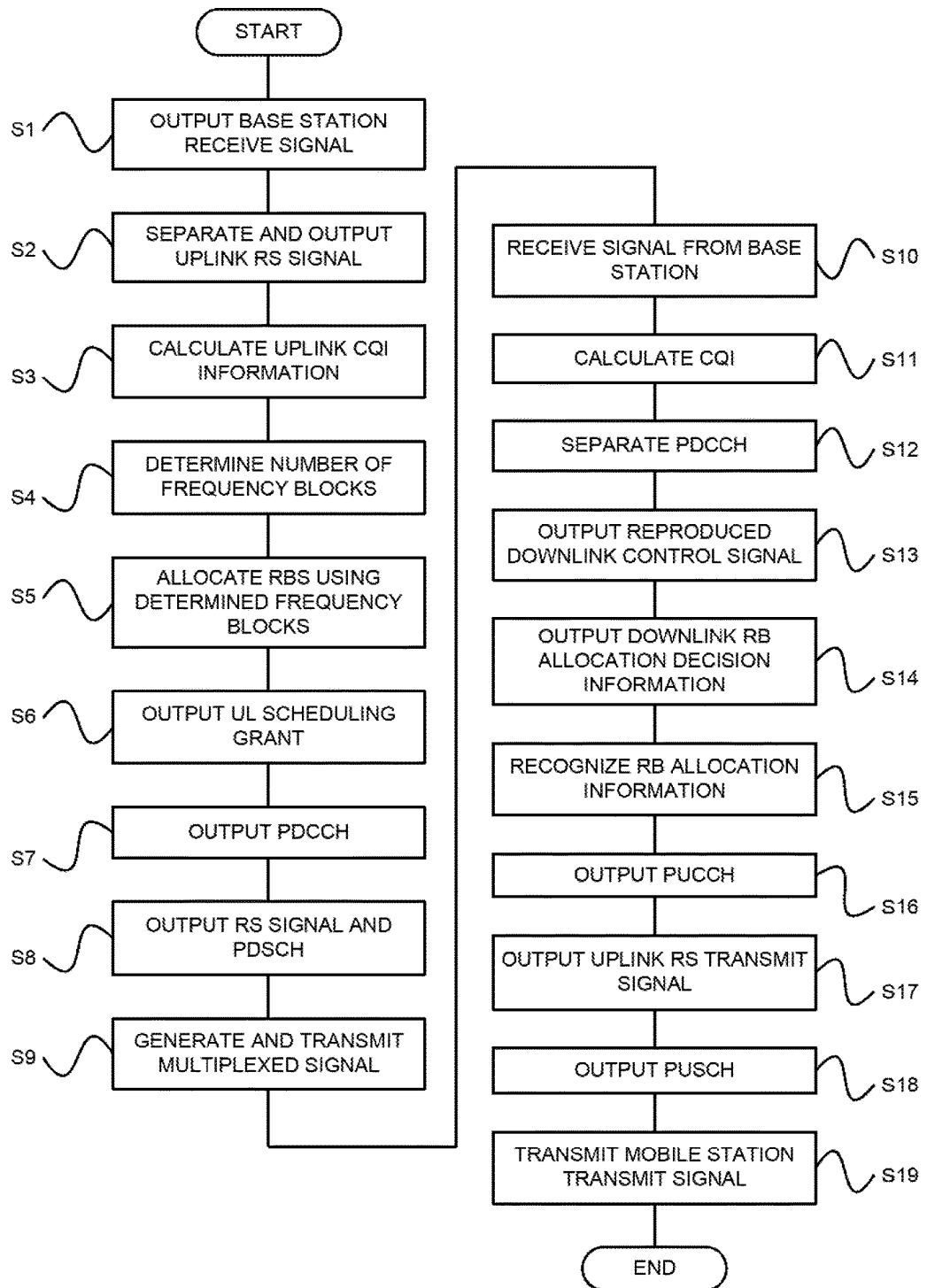
FIG. 4 A flow chart of the first embodiment.

Subsequently, an operation of this embodiment will be described with reference to a flow chart in FIG. 4. The following description will be made with reference to a case in which 100 RBs are allocated.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4).

RBs are allocated so that the determined number of frequency blocks is attained (Step S5).

Next, the uplink scheduler 104 generates information representing positions of the allocated RBs for each frequency block, and outputs it as a number of pieces of UL Scheduling Grant $S_{USCB}$ each having 13 bits, which number is equal to the number of frequency blocks (Step S6).

The downlink control signal generator 111 is supplied with the UL Scheduling Grant $S_{USCB}$, DL Scheduling Grant $S_{DSCB}$ and mobile station identification information $S_{UIDB}$ as input, multiplexes the mobile station identification information $S_{UIDB}$ with each of the plurality of pieces of UL Scheduling Grant $S_{USCB}$ and DL Scheduling Grant $S_{DSCB}$, generates downlink control signals in a number equal to the total number of pieces of Scheduling Grant including the UL Scheduling Grant $S_{USCB}$ and DL Scheduling Grant $S_{DSCB}$ as PDCCH's (Physical Downlink Control Channels) $S_{DCCB}$, and outputs them (Step S7). The PDCCH's (Physical Downlink Control Channels) $S_{DCCB}$ with which the UL Scheduling Grant $S_{USCB}$ is multiplexed are generated in a number equal to the number of frequency blocks.

The downlink RS signal generator 112 generates a downlink RS signal as a downlink RS signal $S_{DRSB}$; the downlink data signal generator 113 receives the DL Scheduling Grant $S_{DSCB}$ as input, multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S8).

The multiplexer 114 receives the PDCCH $S_{DCCB}$, RS signal $S_{DRSB}$ and PDSCH $S_{DDCB}$ as input, and multiplexes these signals to generate a multiplexed downlink signal $S_{MUXB}$; the transmitter 115 generates a transmit signal $S_{TXB}$ from the multiplexed downlink signal $S_{MUXB}$, and transmits it (Step S9).

The receiver 201 in the mobile station 200 receives a signal from the base station 100, establishes downlink synchronization using a guard interval, and outputs a mobile station receive signal $S_{RXU}$ (Step S10).

The downlink RS (Reference Signal) separator 202 receives the mobile station receive signal $S_{RXU}$ as input, separates therefrom a downlink RS signal $S_{DRSU}$ in which the downlink RS signals are multiplexed, and outputs it; the downlink CQI measurement section 203 calculates CQI on an RB-by-RB basis from the downlink RS signal $S_{DRSU}$, and outputs it as downlink CQI information $S_{DCQB}$ (Step S11).

The downlink control signal separator 206 receives the mobile station receive signal $S_{RXU}$ as input, separates therefrom PDCCH $S_{DCCU}$ in which downlink control signals from a plurality of mobile stations are multiplexed, and outputs it (Step S12).

The downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a reproduced downlink control signal $S_{DCMU}$ (Step S13).

The downlink scheduling information extracting section 208 receives the reproduced downlink control signal $S_{DCMU}$ as input, extracts therefrom downlink RB allocation decision information $S_{DSCU}$ corresponding to downlink resource allocation information, and outputs it (Step S14).

The uplink scheduling information extracting section 210 extracts, from the reproduced downlink control signal $S_{DCMU}$, each piece of UL Scheduling Grant, which represents information on allocated uplink RBs, identifies RBs indicated by the uplink RB allocation information, and outputs it as uplink RB allocation decision information $S_{USCU}$ (Step S15).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S16).

The uplink RS signal generator 212 receives the uplink RB allocation decision information $S_{USCU}$ as input, generates an uplink RS transmit signal $S_{URSU}$ using a resource for RS predetermined in the uplink RB allocation decision information $S_{USCU}$, and outputs it (Step S17).

The uplink data signal generator 213 receives the uplink RB allocation decision information $S_{USCU}$ as input, generates Physical Uplink Shared Channel (PUSCH) $S_{UDCU}$ using a resource for a data signal predetermined in the uplink RB allocation decision information $S_{USCU}$, and outputs it (Step S18).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a multiplexed mobile station signal $S_{MUXU}$; the transmitter 215 transmits the multiplexed mobile station signal $S_{MUXU}$ to the base station 100 (Step S19).

While in accordance with the above-described embodiment, the description has been made with reference to a case in which information on resource allocation is represented in the Tree Based method, any method other than the Tree Based method may be employed.

Moreover, while a mode in which the number of frequency blocks is determined from a condition of mobile station's channel quality (CQI measured by a sounding reference signal) is described in this embodiment, it may be contemplated that this embodiment uses information about a communication environment, such as, for example, the cell size, system bandwidth, coverage of a base station, bandwidth of an uplink sounding reference signal, bandwidth used in uplink data transmission, number of levels in multi-level modulation and code rate used in uplink data transmission, transmittable/receivable bandwidth of a mobile station (sometimes referred to as UE capability), and type of uplink transmission data (VoIP, HTTP, FTP etc.), or information affecting the communication environment, such as the billing scheme in which a user signs on, power headroom (which is a difference between the maximum transmit power of a mobile station and an actual transmit power of the mobile station), and target SINR in uplink power control. Further, since the above-described cell size is determined by information affecting the communication environment, such as the location of a base station, distance between base stations, and interference power, these information may be used to select a number of frequency blocks.

Figure 5:
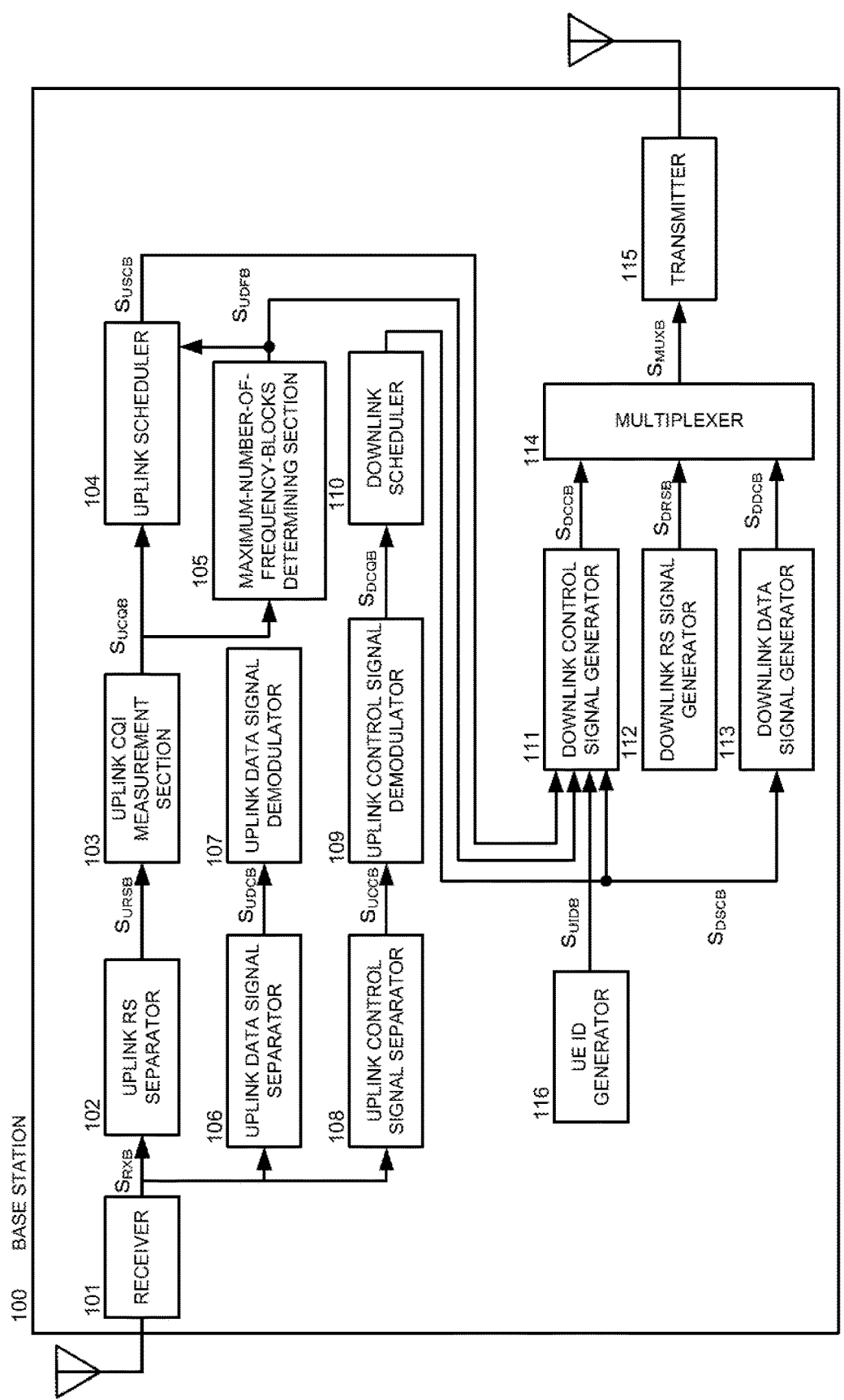
FIG. 5 Another block diagram of a base station in the wireless communication system in the first embodiment.
Figure 6:
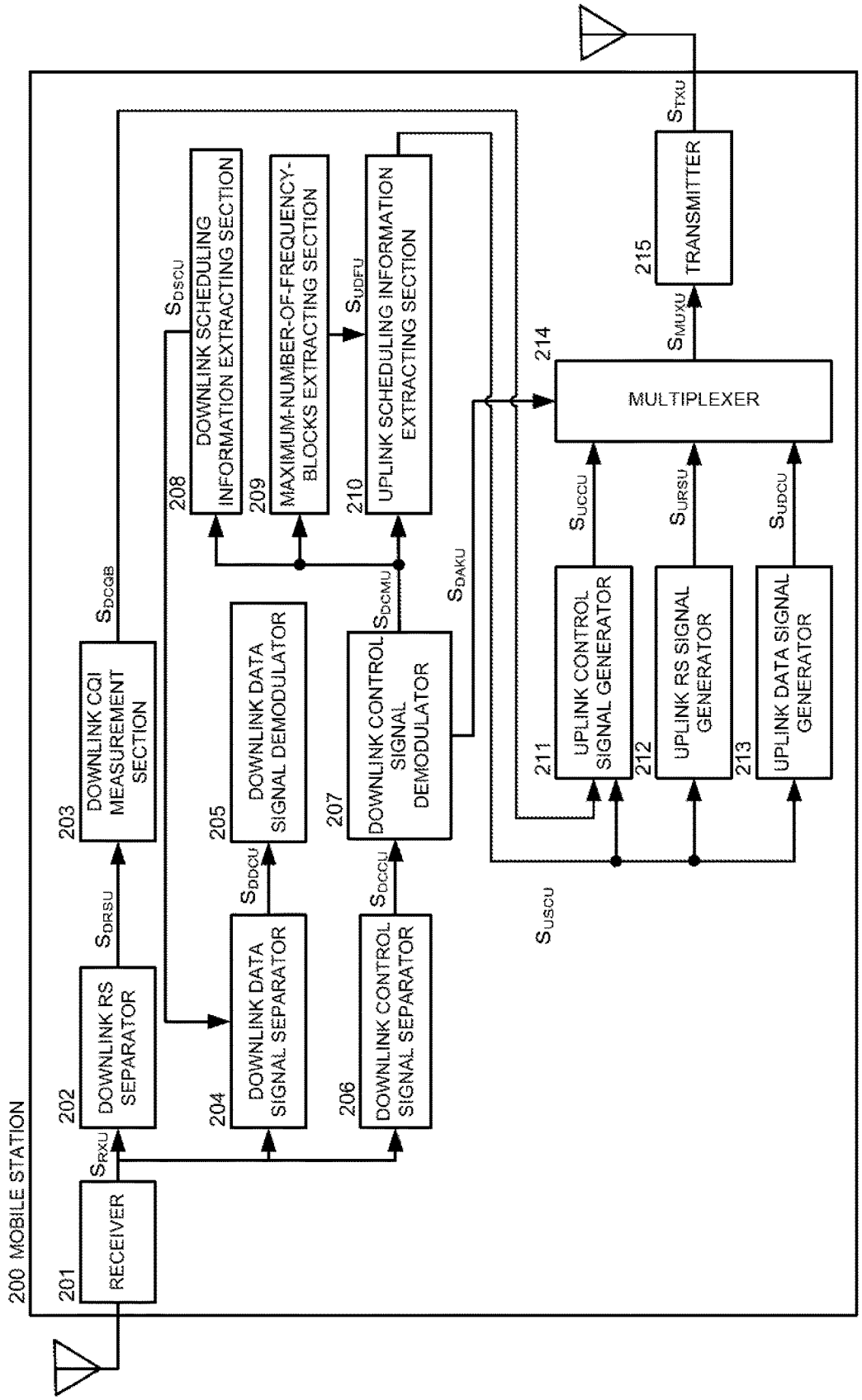
FIG. 6 Another block diagram of a mobile station in the wireless communication system in the first embodiment.

Furthermore, while a mode in which the number of frequency blocks determined in accordance with uplink CQI is equal to the number of PDCCH's has been described in the above-described embodiment, a mode in which the maximum number of frequency blocks determined in accordance with uplink CQI is equal to the number of PDCCH's may be contemplated. In this case, as shown in FIG. 5, the base station is provided with a maximum-number-of-frequency-blocks determining section 105 for determining a maximum number of frequency blocks determined in accordance with uplink CQI. On the other hand, the mobile station is provided with a maximum-number-of-frequency-blocks extracting section 209, as shown in FIG. 6. It should be noted that the maximum number of frequency blocks refers to a maximum number of frequency blocks that can be allocated to one terminal.

Now another method of determining a maximum number of frequency blocks will be described hereinbelow.

First, a configuration will be described in which the maximum-number-of-frequency-blocks determining section determines the maximum number of frequency blocks in accordance with the location of the mobile station and the base station.

Figure 7:
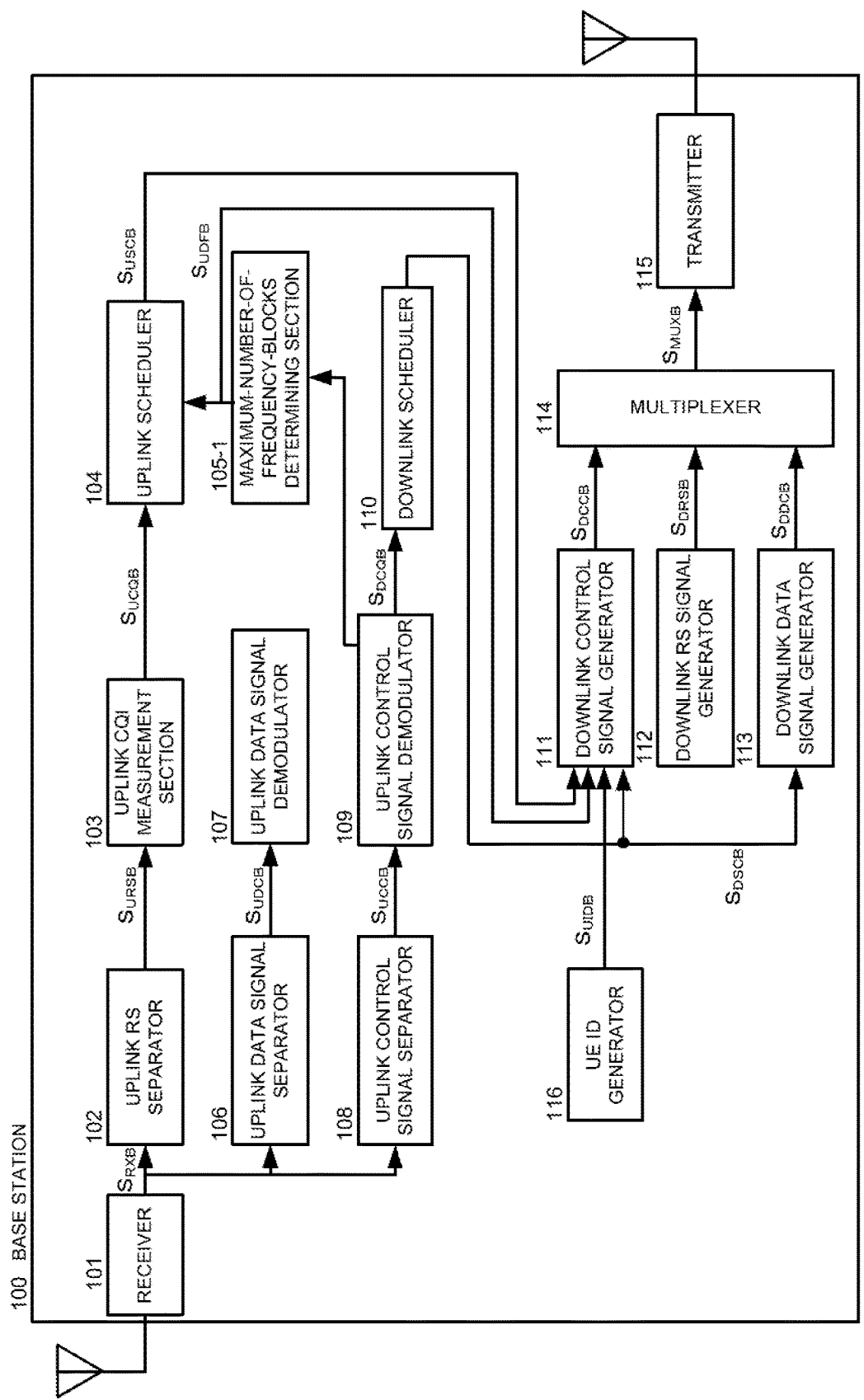
FIG. 7 Still another block diagram of a base station in the wireless communication system in the first embodiment.

FIG. 7 shows a block diagram of a base station 100 for determining the maximum number of frequency blocks in accordance with the location of the mobile station and the base station.

In the base station 100, the uplink control signal demodulator 109 demodulates PUCCH $S_{UCCB}$, and outputs a downlink CQI measurement signal $S_{DCQB}$, which is a result of measurement of downlink CQI transmitted by a plurality of mobile stations, and received mobile station localization information $S_{ULCB}$, which represents the location of the mobile station.

A maximum-number-of-frequency-blocks determining section 105-1 receives the received mobile station localization information $S_{ULCB}$ as input, determines a maximum number of frequency blocks in frequency resources to be allocated to each mobile station from the location of the mobile station represented by the received mobile station localization information $S_{ULCB}$, generates a maximum-frequency-block signal $S_{UDFB}$ for each mobile station, and outputs it. In particular, the maximum number of frequency blocks is determined and generated to have a smaller value for a user located farther away from the base station.

Figure 8:
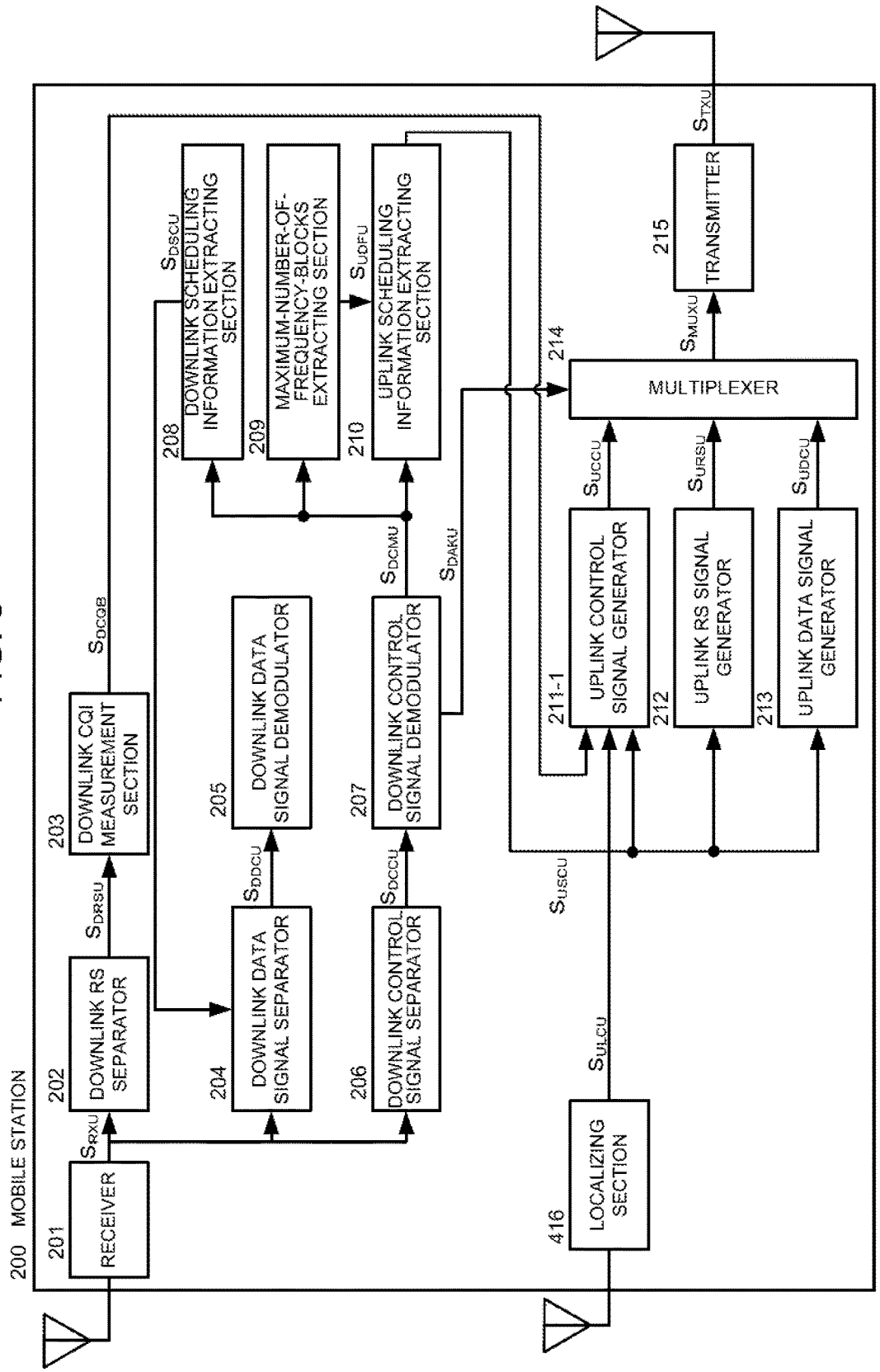
FIG. 8 Still another block diagram of a mobile station in the wireless communication system in the first embodiment.

FIG. 8 shows a block diagram of a mobile station 200 when a maximum number of frequency blocks is determined in accordance with the location of the mobile station and the base station.

In the mobile station 200, a localizing section 416 has a function of locating the mobile station using a signal from a GPS signal satellite, and it receives a signal from the GPS satellite, locates the mobile station 200, generates mobile station localization information $S_{ULCU}$, and outputs it.

An uplink control signal generator 211-1 receives the uplink RB allocation decision information $S_{USCU}$, downlink CQI information $S_{DCQB}$, and mobile station localization information $S_{ULCU}$ as input, generates PUCCH $S_{UCCU}$ using a predetermined resource for a control signal in resources indicated by the uplink RB allocation decision information $S_{USCU}$ along with the downlink CQI information $S_{DCQB}$ and mobile station localization information $S_{ULCU}$, and outputs it.

By the aforementioned configuration, RBs are allocated with a lower allocation resolution to a mobile station having a smaller maximum number of frequency blocks, and with a higher allocation resolution to a mobile station having a larger maximum number of frequency blocks.

Subsequently, a case will be described in which the maximum-number-of-frequency-blocks determining section determines a maximum number of frequency blocks in accordance with the power headroom, which represents an increasable transmit power in a mobile station.

Figure 9:
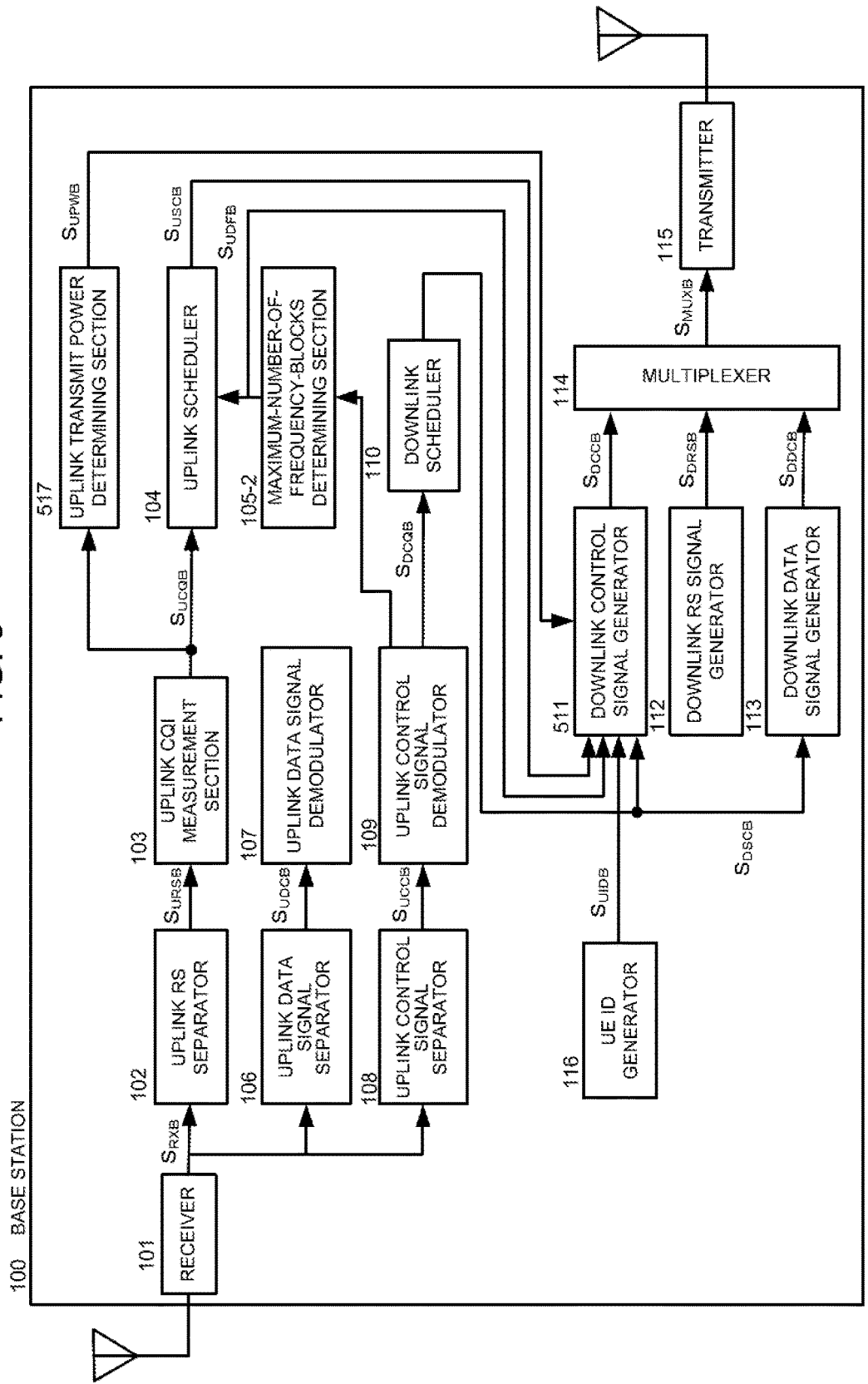
FIG. 9 Yet still another block diagram of a base station in the wireless communication system in the first embodiment.

FIG. 9 shows a block diagram of a base station 100 in which the maximum number of frequency blocks is determined in accordance with the power headroom, which represents an increasable transmit power in a mobile station.

In the base station 100, an uplink transmit power determining section 517 receives the uplink CQI information $S_{UCQB}$ as input, calculates a transmit power value for the mobile station required to satisfy a required receive power, generates uplink transmit power setting information $S_{UPWB}$, and outputs it.

The uplink control signal demodulator 109 demodulates the uplink control signal $S_{UCCB}$, and outputs a downlink CQI measurement signal $S_{DCQB}$, which is a result of measurement of downlink CQI transmitted by a plurality of mobile stations, and mobile station's received power headroom information $S_{UHRB}$.

A maximum-number-of-frequency-blocks determining section 105-2 receives the received power headroom information $S_{UHRB}$ as input, determines a maximum number of frequency blocks in frequency resources to be allocated to each mobile station based on the received power headroom information $S_{UHRB}$, generates a maximum-frequency-block signal $S_{UDFB}$ for the mobile station, and outputs it. In particular, for example, setting the initial value of the maximum number of frequency blocks as one, and in a case that the value represented by the received power headroom information $S_{UHRB}$ exceeds a threshold electric power $P_{DFUP}$ ($P_{DFUP}$ is a positive real number), the value of the maximum number of frequency blocks is incremented by one. In a case that the value represented by the received power headroom information $S_{UHRB}$ is zero and the maximum number of frequency blocks is two or more, the value of the maximum number of frequency blocks is decremented by one. That is, in a case that the transmit power has an extra capacity, the maximum number of frequency blocks is increased to increase the number of allocatable frequency blocks, and enhance the gain in frequency domain channel dependent scheduling. In a case that the transmit power has no extra capacity and is power-limited, the maximum number of frequency blocks is reduced to transmit signals with higher electric power density.

The downlink control signal generator 511 receives the mobile station identification information $S_{UIDB}$, UL Scheduling Grant $S_{USCB}$, DL Scheduling Grant $S_{DSCB}$, maximum-frequency-block signal $S_{UDFB}$ and uplink transmit power setting information $S_{UPWB}$ as input, generates a downlink control signal in which these signals are multiplexed as PDCCH $S_{DCCB}$, and outputs it.

Figure 10:
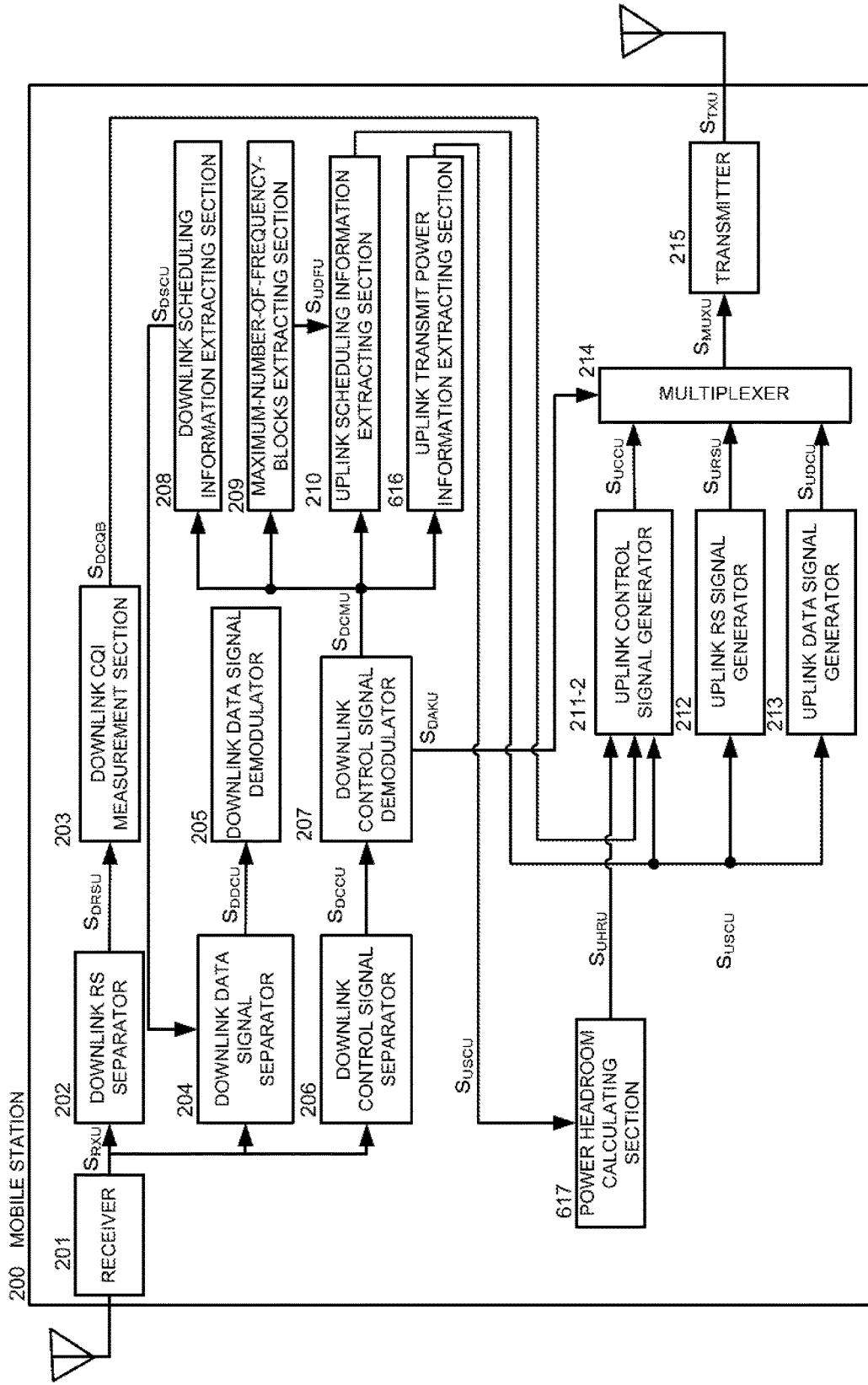
FIG. 10 Yet still another block diagram of a mobile station in the wireless communication system in the first embodiment.

FIG. 10 shows a block diagram of a mobile station 200 in which the maximum number of frequency blocks is determined in accordance with the power headroom, which represents an increasable transmit power in the mobile station.

In the mobile station 200, an uplink transmit power information extracting section 616 extracts, from the reproduced downlink control signal $S_{DCMU}$, received uplink transmit power setting value information $S_{USCU}$ that represents the uplink transmit power value in the mobile station and is notified by the base station, and outputs it.

A power headroom calculating section 617 receives the received uplink transmit power setting value information $S_{USCDU}$ as input, subtracts the received uplink transmit power setting value information $S_{USCU}$ from the maximum transmit power value transmittable by the mobile station, and outputs the resulting value as mobile station power headroom information $S_{UHRU}$. The mobile station power headroom information $S_{UHRU}$ represents the remaining electric power with which the mobile station can perform additional transmission after transmission with an electric power represented by the received uplink transmit power setting value information $S_{USCU}$.

An uplink control signal generator 211-2 receives the uplink RB allocation decision information $S_{USCU}$, downlink CQI information $S_{DCQB}$, and mobile station power headroom information $S_{UHRU}$ as input, generates PUCCH $S_{UCCU}$ using a predetermined resource for a control signal in resources indicated by the uplink RB allocation decision information $S_{USCU}$ along with the downlink CQI information $S_{DCQB}$ and mobile station power headroom information $S_{UHRU}$, and outputs it.

It should be noted that the maximum frequency blocks may be, in addition to the positional relationship between a mobile station and a base station or power headroom, information about a communication environment such as the condition of mobile station's channel quality, a cell size, a system bandwidth, coverage of a base station, a bandwidth of an uplink sounding reference signal, a bandwidth used in uplink data transmission, the number of levels in multi-level modulation and a code rate used in uplink data transmission, a transmittable/receivable bandwidth of a mobile station (sometimes referred to as UE capability), and a type of uplink transmission data (VoIP, HTTP, FTP etc.), or information affecting the communication environment, such as the billing scheme in which a user signs on, and a target SINR in uplink power control.

As described above, by generating a number of PDCCH's, which number is equal to the number of frequency blocks, with resource block allocation information of a required minimum number of bits, useless resources in PDCCH can be reduced.

Second Embodiment

The foregoing embodiment has addressed a mode in which Uplink Scheduling Grant and control signals PDCCH's for notifying the Uplink Scheduling Grant to a terminal are generated in a number equal to the number of frequency blocks or the maximum number of frequency blocks. In the following embodiment, a mode in which a base station notifies the number of frequency blocks to a mobile station in the foregoing embodiment will be described. It should be noted that components similar to those in the foregoing embodiment are designated by similar reference numerals and detailed description thereof will be omitted.

The uplink scheduler 104 outputs resource allocation information representing positions of allocated RBs as UL Scheduling Grant $S_{USCB}$, and a determined number of frequency blocks as $S_{UDFB}$.

The downlink control signal generator 111 is supplied with the UL Scheduling Grant $S_{USCB}$, mobile station identification signal $S_{UIDB}$, and DL Scheduling Grant $S_{DSCB}$ as input, multiplexes the mobile station identification signal $S_{UIDB}$ with each of the plurality of pieces of UL Scheduling Grant and DL Scheduling Grant, and generates a downlink control signal PDCCH $S_{DCCB}$ from each of the plurality of pieces of UL Scheduling Grant, and moreover, generates a downlink control signal PDCCH $S_{DCCB}$ from the DL Scheduling Grant. The downlink control signals PDCCH's $S_{DCCB}$ are generated as the downlink control signal PDCCH $S_{DCCB}$ for UL Scheduling Grant $S_{USCB}$ and that for the DL Scheduling Grant $S_{DSCB}$. In other words, the downlink control signals PDCCH's $S_{DCCB}$ are generated in a number equal to the total number of pieces of Scheduling Grant including the UL Scheduling Grant $S_{USCB}$ and DL Scheduling Grant $S_{DSCB}$. The downlink control signal PDCCH $S_{DCCB}$ is multiplexed with information bits indicating a DCI (Downlink Control Information) format, which is an identifier for distinguishing between the UL Scheduling Grant and DL Scheduling Grant. For example, a DCI format of zero is multiplexed for UL Scheduling Grant and of one for DL Scheduling Grant in the downlink control signal PDCCH $S_{DCCB}$. Furthermore, the number of frequency blocks $S_{UDFB}$ is received as input to generate a higher-layer control signal, which is output in PBCH (Physical Broadcast Channel).

The downlink control signal separator 206 receives the mobile station receive signal $S_{RXU}$ as input, separates therefrom PDCCH $S_{DCCU}$ in which downlink control signals from a plurality of mobile stations are multiplexed and PBCH, and outputs them.

The downlink control signal demodulator 207 receives the PBCH as input, demodulates it to reproduce a higher-layer control signal, and separates therefrom a result of reproduction in which mobile station identification information corresponding to the mobile station itself is multiplexed. Then, it recognizes the number of PDCCH's destined to the mobile station itself from the number of frequency blocks in the reproduced higher-layer control signal, and when the number of demodulated PDCCH's destined to the mobile station itself reaches a number equal to the number of frequency blocks, terminates demodulation of PDCCH.

Figure 11:
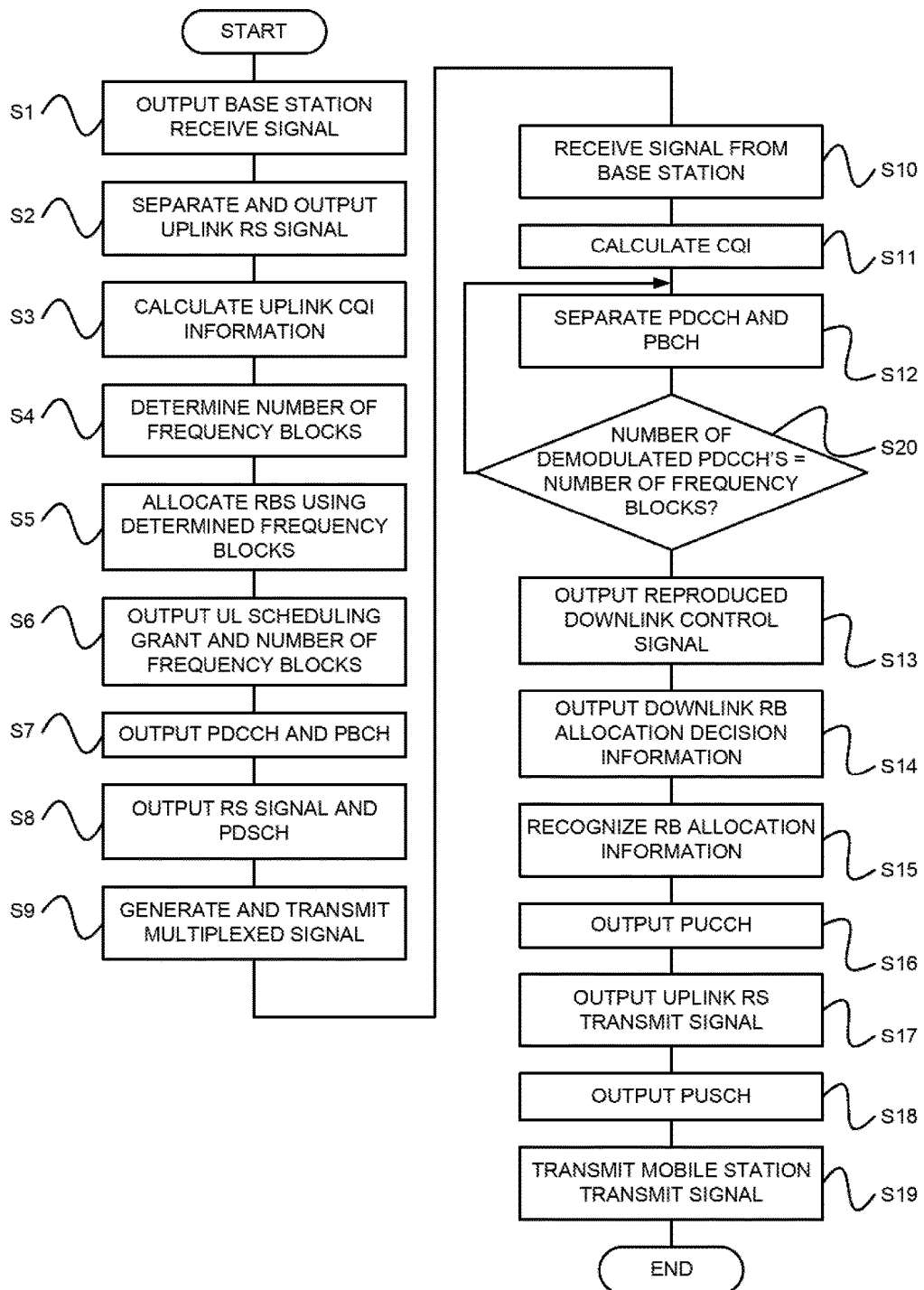
FIG. 11 A flow chart of a second embodiment.

Subsequently, an operation of this embodiment will be described with reference to a flow chart in FIG. 11.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4).

RBs are allocated so that the determined number of frequency blocks is attained (Step S5).

Next, the uplink scheduler 104 generates information representing positions of the allocated RBs for each frequency block, and outputs it as a number of pieces of UL Scheduling Grant $S_{USCB}$ each having 13 bits, which number is equal to the number of frequency blocks. Moreover, the determined frequency blocks is output as $S_{UDFB}$ (Step S6).

The downlink control signal generator 111 is supplied with the UL Scheduling Grant $S_{USCB}$, DL Scheduling Grant $S_{DSCB}$ and mobile station identification information $S_{UIDB}$ as input, multiplexes the mobile station identification information $S_{UIDB}$ with each of the plurality of pieces of UL Scheduling Grant $S_{USCB}$ and DL Scheduling Grant $S_{DSCB}$, generates downlink control signals in a number equal to the total number of pieces of Scheduling Grant including the UL Scheduling Grant $S_{USCB}$ and DL Scheduling Grant $S_{DSCB}$ as PDCCH's (Physical Downlink Control Channels) $S_{DCCB}$, and outputs them. The PDCCH's (Physical Downlink Control Channels) $S_{DCCB}$ with which the UL Scheduling Grant $S_{USCB}$ is multiplexed are generated in a number equal to the number of frequency blocks. Moreover, it receives the number of frequency blocks $S_{UDFB}$ as input, and generates a higher-layer control signal, which is output in PBCH (Step S7).

The downlink RS signal generator 112 generates a downlink RS signal as a downlink RS signal $S_{DRSB}$; the downlink data signal generator 113 multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S8).

The multiplexer 114 receives the PDCCH $S_{DCCB}$, RS signal $S_{DRSB}$ and PDSCH $S_{DDCB}$ as input, and multiplexes these signals to generate a multiplexed downlink signal $S_{MUXB}$; the transmitter 115 generates a transmit signal $S_{TXB}$ from the multiplexed downlink signal $S_{MUXB}$, and transmits it (Step S9).

The receiver 201 in the mobile station 200 receives a signal from the base station 100, establishes downlink synchronization using a guard interval, and outputs a mobile station receive signal $S_{RXU}$ (Step S10).

The downlink RS (Reference Signal) separator 202 receives the mobile station receive signal $S_{RXU}$ as input, and separates therefrom a downlink RS signal $S_{DRSU}$ in which the downlink RS signals are multiplexed; the downlink CQI measurement section 203 calculates CQI on an RB-by-RB basis from the downlink RS signal $S_{DRSU}$, and outputs it as downlink CQI information $S_{DCQB}$ (Step S11).

The downlink control signal separator 206 receives the mobile station receive signal $S_{RXU}$ as input, separates therefrom PDCCH $S_{DCCU}$ in which downlink control signals from a plurality of mobile stations are multiplexed and PBCH, and outputs them (Step S12).

The downlink control signal demodulator 207 receives the PBCH as input, demodulates it to reproduce a higher-layer control signal, separates therefrom a result of reproduction in which mobile station identification information corresponding to the mobile station itself is multiplexed, recognizes the number of PDCCH's destined to the mobile station itself from the number of frequency blocks in the reproduced higher-layer control signal, and when the number of demodulated PDCCH's destined to the mobile station itself reaches a number equal to the number of frequency blocks, terminates demodulation of PDCCH (Step S20).

The downlink control signal demodulator 207 receives the PDCCH $S_{DCCU}$ as input, demodulates it to reproduce a downlink control signal, separates therefrom a result of reproduction in which mobile station identification information corresponding to the mobile station itself is multiplexed, and outputs it as a reproduced downlink control signal $S_{DCMU}$ (Step S13).

The downlink scheduling information extracting section 208 receives the reproduced downlink control signal $S_{DCMU}$ as input, extracts therefrom downlink RB allocation decision information $S_{DSCU}$ corresponding to downlink resource allocation information, and outputs it (Step S14).

The uplink scheduling information extracting section 210 extracts, from the reproduced downlink control signal $S_{DCMU}$, UL Scheduling Grant, which represents information on allocated uplink RBs, identifies RBs indicated by the uplink RB allocation information, and outputs it as uplink RB allocation decision information $S_{USCU}$ (Step S15).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S16).

The uplink RS signal generator 212 receives the uplink RB allocation decision information $S_{USCU}$ as input, generates an uplink RS transmit signal $S_{URSU}$ using a resource for RS predetermined in the uplink RB allocation decision information $S_{USCU}$, and outputs it (Step S17).

The uplink data signal generator 213 receives the uplink RB allocation decision information $S_{USCU}$ as input, generates Physical Uplink Shared Channel (PUSCH) $S_{UDCU}$ using a resource for a data signal predetermined in the uplink RB allocation decision information $S_{USCU}$, and outputs it (Step S18).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a multiplexed mobile station signal $S_{MUXU}$; the transmitter 215 transmits the multiplexed mobile station signal $S_{MUXU}$ to the base station 100 (Step S19).

While the number of frequency blocks is described above as being notified through PBCH, it is additionally notified with a higher-layer control signal mapped to PDSCH (Physical Downlink Shared Channel) or the like. Moreover, in a case that the maximum frequency block is determined on a mobile station-by-mobile station basis, a base station may be configured to notify the maximum frequency block to a mobile station.

As described above, by notifying beforehand, from a base station to a mobile station, the number of frequency blocks corresponding to the number of PDCCH's transmitted to a mobile station or the maximum number of frequency blocks, the present invention may provide an additional effect of reducing the processing load on the mobile station. For example, according to LTE, a mobile station obtains PDCCH destined to the mobile station itself by checking information on a mobile station identifier multiplexed with PDCCH as to whether it is destined to the mobile station itself. When the number of demodulated PDCCH's destined to the mobile station itself reaches the number of frequency blocks or the maximum number of frequency blocks notified by base station, the mobile station can terminate PDCCH demodulation processing. In other words, the mobile station does not need to demodulate all PDCCH's, so that its processing load can be reduced.

Third Embodiment

The following embodiment will address a mode in which the number of bits for UL Scheduling Grant can be reduced. It should be noted that components similar to those in the foregoing embodiments are designated by similar reference numerals and detailed description thereof will be omitted. While the following description will be made with reference to the second embodiment, it may be based on the first embodiment.

An uplink scheduler 104 makes uplink scheduling for each mobile station. The uplink scheduler 104 determines a number of frequency blocks for resources to be allocated based on the uplink CQI information $S_{UCQB}$. RBs are allocated with an allocation resolution determined in accordance with the determined number of frequency blocks and with the determined number of frequency blocks. Once the allocation resolution has been determined, a structure in the Tree-Based method representing positions of the allocated RBs is determined accordingly. Scheduling information of the resource allocation information for each frequency block representing the positions of the allocated RBs in a Tree-Based form and the value of the allocation resolution is generated for each frequency block, that is, UL Scheduling Grant $S_{USCB}$ for a number of frequency blocks is output in a number of bits in accordance with the determined structure in the Tree-Based method. The number of frequency blocks is also output as $S_{UDFB}$. While the value of the allocation resolution may be written in all pieces of UL Scheduling Grant, it may be written in a first notified piece of UL Scheduling Grant.

Now processing in the uplink scheduler 104 will be specifically described next.

The uplink scheduler 104 modifies and sets a minimal frequency bandwidth in resource allocation, that is, an allocation resolution, which is a minimal unit for resource block allocation, in accordance with the number of frequency blocks determined based on the uplink CQI information $S_{UCQB}$. Specifically, a higher allocation resolution is set for a larger number of frequency blocks.

Next, a specific example will be described below, in which the number of signaling bits for use in resource allocation for one user is held down within 14 bits for a system band having 10 RBs.

Figures 12, 13:
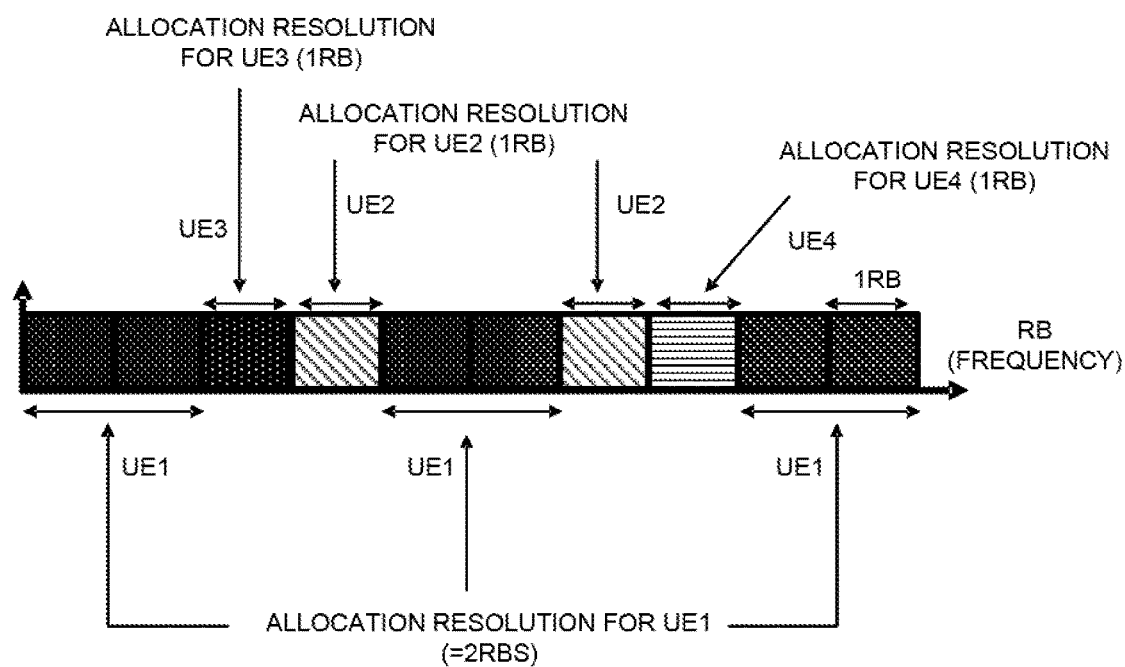
FIG. 12 An example of a correspondence table for a frequency block and an allocation resolution.
FIG. 13 A diagram showing an example of RBs allocated to a mobile station.
Figure 14:
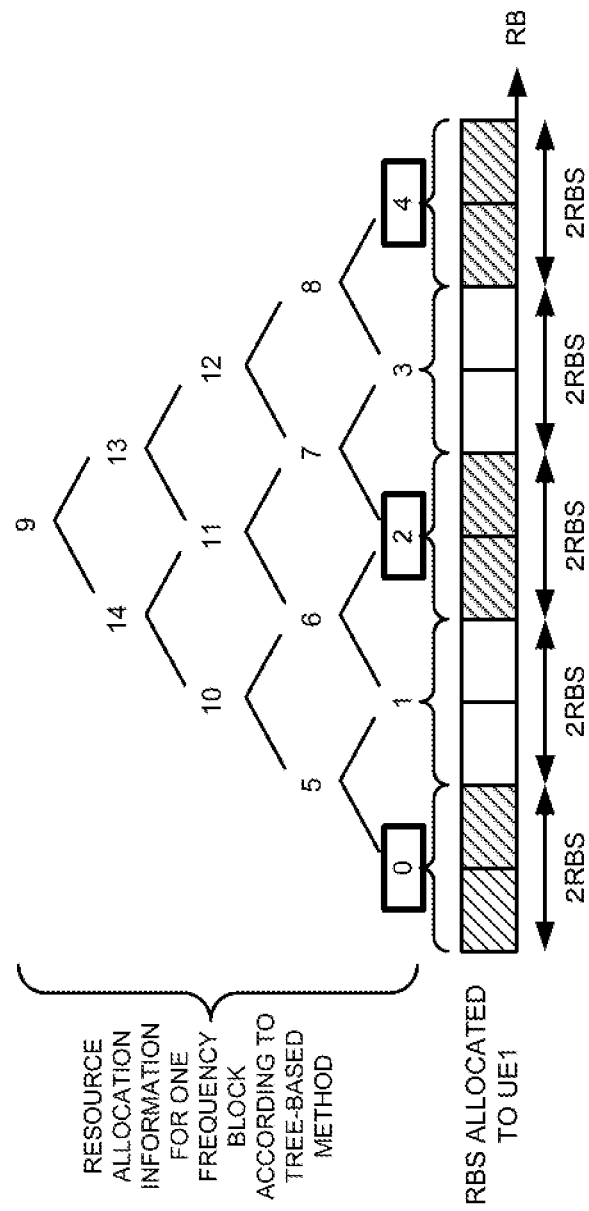
FIG. 14 A diagram showing an example of RBs allocated to UE1 and UL Scheduling Grant.
Figure 15:
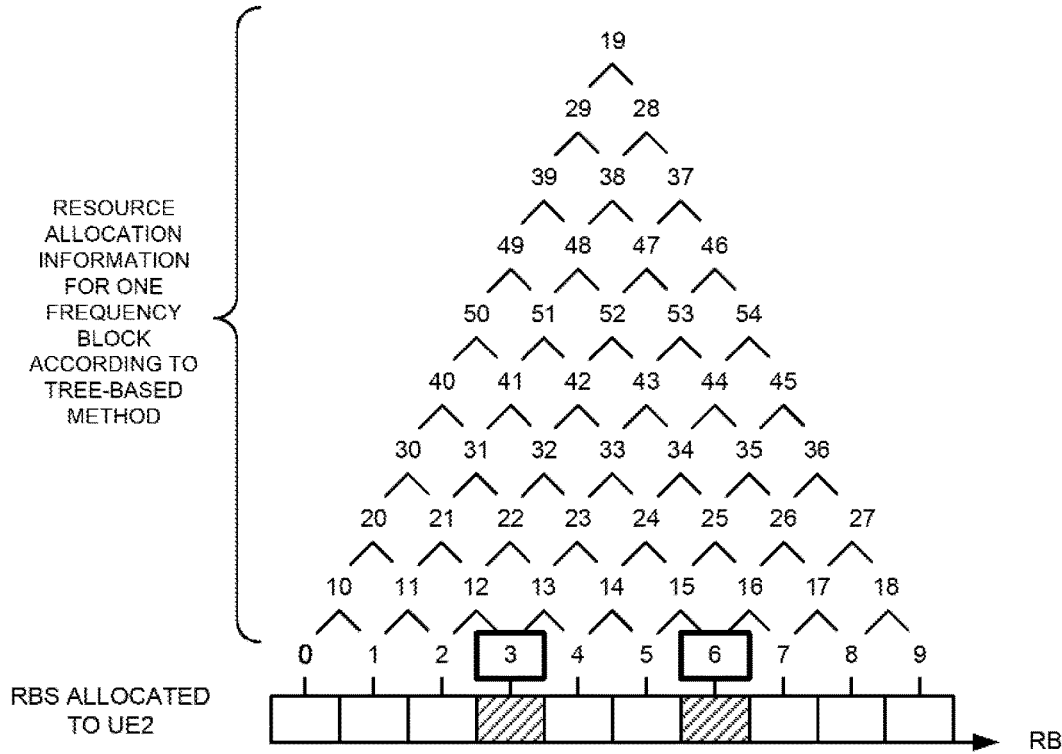
FIG. 15 A diagram showing an example of RBs allocated to UE2 and UL Scheduling Grant.

Resource allocation at the uplink scheduler 104 is made using a correspondence table representing a relationship between the number of frequency blocks and allocation resolution, as shown in FIG. 12. The correspondence table is defined depending upon a communication environment, etc. For example, a higher allocation resolution is defined for a larger number of frequency blocks. By using this relationship, it is possible to hold the number of signaling bits down to 14 bits including notification of the value of the allocation resolution (2 bits) for a number of frequency blocks of four or smaller.

Assume that there are four mobile stations UE1, UE2, UE3, UE4, and the number of frequency blocks allocated to UE1 is three, that allocated to UE2 is two, that allocated to UE3 is one, and that allocated to UE4 is one. Now representing the resource blocks shown in FIG. 13 as RB0, RB1, . . . , RB8, RB9 in sequence from left to right, it is assumed that scheduling is made to allocate RB0, RB1, RB4, RB5, RB8 and RB9 to UE1, RB3 and RB6 to UE2, RB2 to UE3, and RB7 to UE4. Now a case in which the scheduling in FIG. 13 and relationship between the number of frequency blocks and allocation resolution in FIG. 12 are used will be described. FIGS. 14, 15, 16 and 17 show examples of RB allocation and UL Scheduling Grant using the Tree-Based method for UE1, UE2, UE3 and UE4, respectively.

Figure 16:
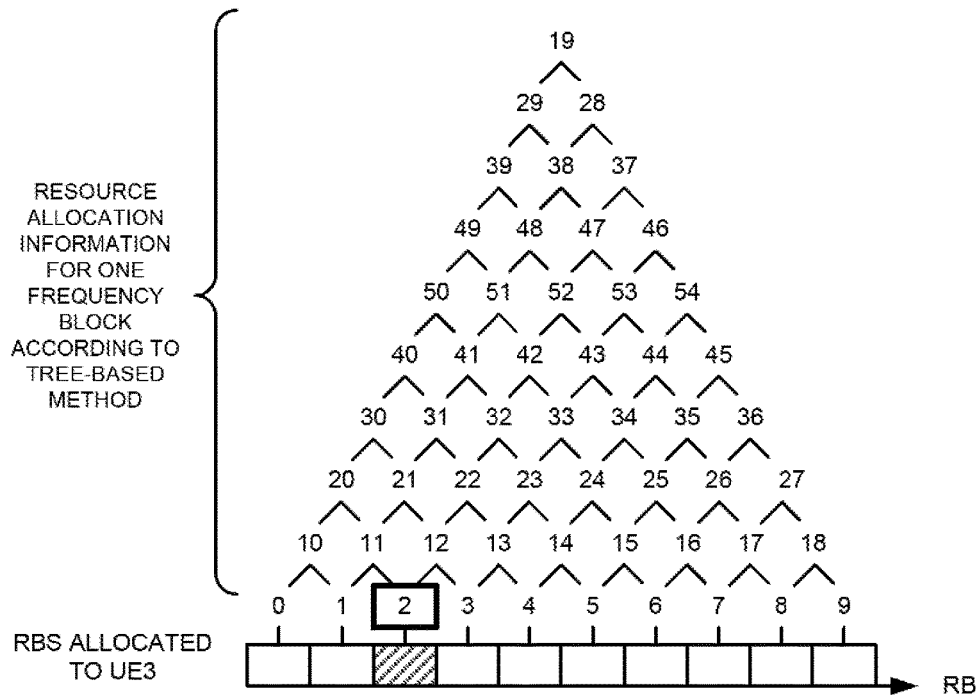
FIG. 16 A diagram showing an example of an RB allocated to UE3 and UL Scheduling Grant.
Figure 17:
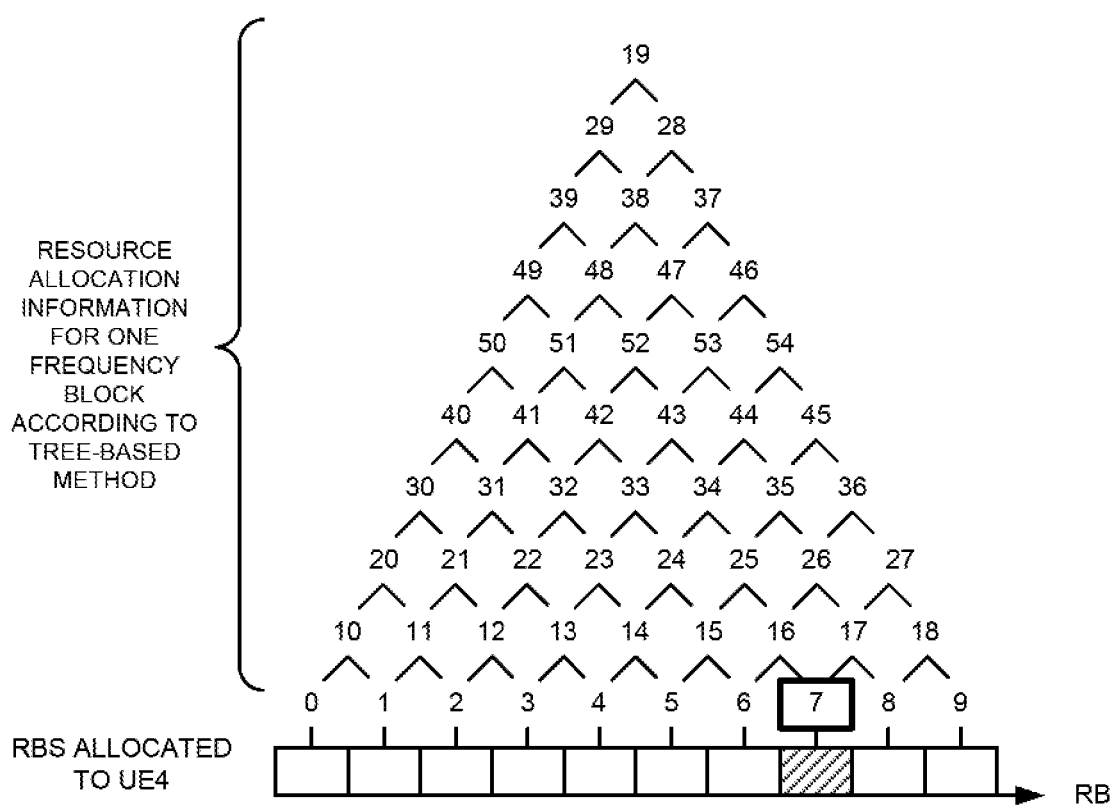
FIG. 17 A diagram showing an example of an RB allocated to UE4 and UL Scheduling Grant.

Since the number of frequency blocks is one for UE3 and UE4, the allocation resolution is 1 RB with reference to the correspondence table in FIG. 12. Therefore, when allocating resource blocks to UE3 and UE4, they are allocated such that one resource block is allocated with a number of frequency blocks within one. To represent a resource corresponding to one frequency block within the whole band, 10 RBs, in the Tree-Based method with an allocation resolution of 1 RB, a value of any one of 1-55 is required (6 bits). Referring to FIGS. 16 and 17, values of 1-55 representing resources of one frequency block are arranged in a tree structure. The tree structure in the Tree-Based method varies with the allocation resolution. In other words, the number of bits for UL Scheduling Grant also varies.

For example, referring to FIG. 18, when the allocation resolution is 1 RB, the tree structure is constructed from a number sequence of 1-55 that can be expressed by 6 bits. When the allocation resolution is 2 RBs, allocation is made for each unit of two resource blocks, so that it can be handled with a number sequence similar to that for a system band of 5 RBs. Accordingly, the tree structure is constructed from a number sequence of 1-15. By correlating the tree structure with the determined number of frequency blocks in a one-to-one correspondence, and notifying the allocation resolution or number of frequency blocks to the mobile station, a tree structure in the Tree-Based method can be discriminated.

Since scheduling is made with a number of frequency blocks=1 for UE3 and UE4, one piece of UL Scheduling Grant is generated for UE3 and UE4. The number of bits in the UL Scheduling Grant is 6+2 bits=8 bits, including notification of the value of the allocation resolution. Fields represented by the UL Scheduling Grant to be notified to UE3 include a value of the allocation resolution of "1" and a position of "2" ("2" in FIG. 16), which is the position of an allocated resource block represented in a tree structure. UL Scheduling Grant for UE4 has 8 bits, and a value of the allocation resolution of "1" and a position represented in a tree structure, "7" ("7" in FIG. 17), are notified thereto.

For UE2, the number of frequency blocks is two, and therefore, the allocation resolution is 1 RB with reference to the correspondence table in FIG. 12. To represent a resource corresponding to one frequency block within the whole band, 10 RBs, in the Tree-Based method with an allocation resolution of 1 RB, a value of any one of 1-55 that can be denoted by 6 bits is used. Since scheduling is made with two frequency blocks for UE2, two pieces of UL Scheduling Grant are generated for UE2. The number of bits in the UL Scheduling Grant includes UL Scheduling Grant of 6+2 bits=8 bits and UL Scheduling Grant of 6 bits, including notification of the value of the allocation resolution. Fields represented by the UL Scheduling Grant to be notified to UE2 include a value of the allocation resolution of "1" and positions of allocated resource blocks represented in a tree structure, "3" and "6" ("3" and "6" in FIG. 15). It should be noted that in a case of the value of the allocation resolution is written in all pieces of UL Scheduling Grant, two pieces of UL Scheduling Grant of 6+2 bits=8 bits are used.

For UE1, the number of frequency blocks is three, and therefore, the allocation resolution is 2 RBs with reference to the correspondence table in FIG. 12. To represent a resource corresponding to one frequency block within the whole band, 10 RBs, in the Tree-Based method with an allocation resolution of 2 RBs, a value of any one of 1-15, which can be denoted by 4 bits, is used. Since scheduling is made with three frequency blocks for UE1, three pieces of UL Scheduling Grant are generated for UE1. The number of bits in the UL Scheduling Grant includes UL Scheduling Grant of 4+2 bits=6 bits and two pieces of UL Scheduling Grant of 4 bits, including notification of the value of the allocation resolution. Fields represented by the UL Scheduling Grant to be notified to UE1 include a value of the allocation resolution of "2" and positions of allocated resource blocks represented in a tree structure, "0", "2" and "4" ("0", "2" and "4" in FIG. 14). It should be noted that in a case of the value of the allocation resolution is written in all pieces of UL Scheduling Grant, three pieces of UL Scheduling Grant of 4+2 bits=6 bits are used. By thus increasing the allocation resolution, the amount of information on resource allocation can be held down even for an increased number of frequency blocks.

Next, a general method of generating resource allocation information in a tree structure will be described. An example of an allocation resolution of P resource blocks (P is one or more) and a number of frequency blocks of n (n is one or more) will be described hereinbelow with reference to EQ. 1. In this example, one frequency block is defined as P (allocation resolution) consecutive resource blocks. Resource allocation information is composed of n resource indicator values (RIV's). The resource indicator value $RIV_n$ for an n-th frequency block represents a frequency block at start ($RBG_{start,n}$) and a length of subsequent frequency blocks ($L_{CRBGs,n}$). The n-th resource indicator value $RIV_n$ is defined by EQ. 1 below:

if $$(L_{CRBGs,n}-1) \leq \lfloor N_{RBG}^{UL}/2 \rfloor$$

then $$RIV_n = N_{RB}^{UL}(L_{CRBGs,n}-1) + RBG_{START,n}$$

else $$RIV_n = N_{RBG}^{UL}(N_{RBG}^{UL} - L_{CRBGs,n}+1) + (N_{RBG}^{UL}-1-RBG_{START,n}) \quad \text{(EQ. 1)}$$

where $N^{UL}_{RBG}$ is the number of frequency blocks in the whole system. The number of resource blocks in the whole system is $N^{UL}_{RBG} \times P$ (allocation resolution).

While the following description will be made with reference to a configuration in which UL Scheduling Grant is generated in a number equal to the number of frequency blocks as described above, other configurations may be employed. For example, a configuration in which information on allocation of a plurality of frequency blocks is written in one piece of UL Scheduling Grant to reduce the number of pieces of UL Scheduling Grant relative to the number of frequency blocks may be contemplated. Here, such a configuration will be described below with reference to a case in which UE1 has a number of frequency blocks of three and two pieces of UL Scheduling Grant are generated.

One piece of UL Scheduling Grant has information on a resource corresponding to one frequency block and the value of the allocation resolution (4+2 bits=6 bits) incorporated therein, and the other piece of UL Scheduling Grant has information on a resource corresponding to two frequency blocks (4+4 bits=8 bits) incorporated therein. Alternatively, one piece of UL Scheduling Grant may have information on a resource corresponding to two frequency blocks and the value of the allocation resolution (4+4+2 bits=10 bits) incorporated therein, and the other piece of UL Scheduling Grant may have information on a resource (4 bits) corresponding to one frequency block incorporated therein. In a case that the maximum number of bits that can be incorporated in UL Scheduling Grant is determined beforehand, the number of pieces of information on allocation of frequency blocks to be incorporated one piece of UL Scheduling Grant may be determined depending upon the number of bits.

While in accordance with the second embodiment, a base station notifies the number of frequency blocks to a mobile station, the number of frequency blocks is different from the number of PDCCH's (Physical Downlink Control Channels) in a case that the number of pieces of UL Scheduling Grant is smaller than the number of frequency blocks in this embodiment, so that the base station notifies the number of PDCCH's (Physical Downlink Control Channels) to the mobile station. As a result, the number of demodulation operations on PDCCH (Physical Downlink Control Channel) in a terminal may be further reduced relative to that in the second embodiment.

The thus-generated UL Scheduling Grant $S_{USCB}$ is input to the downlink control signal generator 111. The downlink control signal generator 111 is also supplied as input with the DL Scheduling Grant $S_{DSCB}$, mobile station identification information $S_{UIDB}$, and frequency-block signal $S_{UDFB}$. It multiplexes the mobile station identification signal $S_{UIDB}$ with each of the plurality of pieces of UL Scheduling Grant and DL Scheduling Grant, generates a downlink control signal PDCCH $S_{DCCB}$ from each of the plurality of pieces of UL Scheduling Grant, and moreover, generates a downlink control signal PDCCH $S_{DCCB}$ from the DL Scheduling Grant. The downlink control signal's PDCCH's $S_{DCCB}$ are generated in a number equal to the total number of pieces of Scheduling Grant including the UL Scheduling Grant $S_{USCB}$ and DL Scheduling Grant $S_{DSCB}$. Moreover, the downlink control signal PDCCH $S_{DCCB}$ is multiplexed with information bits indicating a DCI (Downlink Control Information) format, which is an identifier for distinguishing between the UL Scheduling Grant and DL Scheduling Grant. For example, a DCI format of zero is multiplexed for UL Scheduling Grant and of one for DL Scheduling Grant in the downlink control signal PDCCH $S_{DCCB}$.

The downlink control signal demodulator 207 receives the PDCCH $S_{DCCU}$ as input, demodulates it to reproduce a downlink control signal, separates therefrom a result of reproduction in which the mobile station identification information corresponding to the mobile station itself is multiplexed, and outputs it as a reproduced downlink control signal $S_{DCMU}$. It should be noted that the PDCCH's for the mobile station itself are multiplexed in a number equal to the number of frequency blocks allocated to the mobile station itself.

The uplink scheduling information extracting section 210 extracts, from the reproduced downlink control signal $S_{DCMU}$, UL Scheduling Grant that represents information on allocated uplink RBs. Next, it discriminates a tree structure in the Tree-Based method from the value of the allocation resolution contained in the UL Scheduling Grant, identifies an RB indicated by the uplink RB allocation information in this tree structure, and outputs it as uplink RB allocation decision information $S_{USCU}$.

Figure 19:
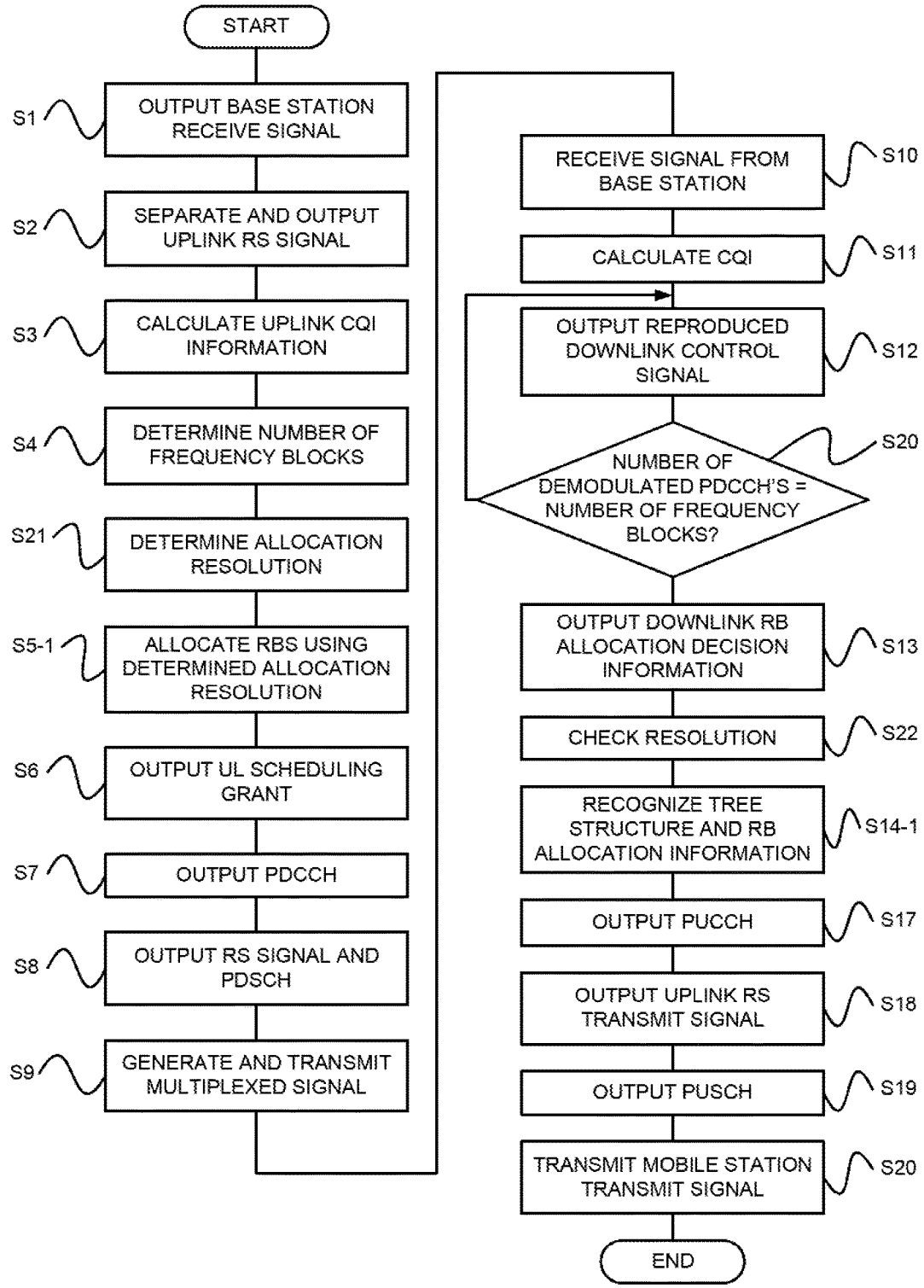
FIG. 19 A flow chart of a third embodiment.

Subsequently, an operation of this embodiment will be described with reference to a flow chart in FIG. 19.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4).

An allocation resolution correlated with the determined number of frequency blocks is determined using the correspondence table as shown in FIG. 12 kept in the equipment itself, whereby a structure in the Tree-Based method is determined, and the number of bits for UL Scheduling Grant is set as a number of bits in accordance with the determined structure in the Tree-Based method (Step S21).

RBs are allocated with resource blocks in a number equal to the determined allocation resolution and with the determined number of frequency blocks (Step S5-1).

Next, the uplink scheduler 104 outputs information representing positions of the allocated RBs in a Tree-Based form and the value of the allocation resolution in a specified number of bits as UL Scheduling Grant $S_{USCB}$ for each frequency block, and outputs the number of frequency blocks as $S_{UDFB}$ (Step S6).

The downlink control signal generator 111 is supplied with the UL Scheduling Grant $S_{USCB}$, DL Scheduling Grant $S_{DSCB}$, mobile station identification information $S_{UIDB}$, and frequency-block signal $S_{UDFB}$ as input, multiplexes mobile station identification information $S_{UIDB}$ with each of the plurality of pieces of UL Scheduling Grant $S_{USCB}$ and DL Scheduling Grant $S_{DSCB}$, generates downlink control signals in a number equal to the total number of pieces of Scheduling Grant including the UL Scheduling Grant $S_{USCB}$ and DL Scheduling Grant $S_{DSCB}$ as PDCCH's (Physical Downlink Control Channels) $S_{DCCB}$, and outputs them. The PDCCH's (Physical Downlink Control Channels) $S_{DCCB}$ with which the UL Scheduling Grant $S_{USCB}$ is multiplexed are generated in a number equal to the number of frequency blocks. Moreover, it uses the number of frequency blocks $S_{UDFB}$ as input to generate a higher-layer control signal, which is output in PBCH (Step S7).

The downlink RS signal generator 112 generates a downlink RS signal as a downlink RS signal $S_{DRSB}$, and outputs it; the downlink data signal generator 113 receives the DL Scheduling Grant $S_{DSCB}$ as input, multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S8).

The multiplexer 114 receives the PDCCH $S_{DCCB}$, RS signal $S_{DRSB}$ and PDSCH $S_{DDCB}$ as input, multiplexes these signals to generate a multiplexed downlink signal $S_{MUXB}$, and outputs it; the transmitter 115 receives the multiplexed downlink signal $S_{MUXB}$ as input, generates a transmit signal $S_{TXB}$, and outputs it (Step S9).

The receiver 201 in the mobile station 200 receives a signal from the base station 100, establishes downlink synchronization using a guard interval, and outputs a mobile station receive signal $S_{RXU}$ (Step S10).

The downlink RS (Reference Signal) separator 202 receives the mobile station receive signal $S_{RXU}$ as input, and separates therefrom a downlink RS signal $S_{DRSU}$ in which the downlink RS signals are multiplexed; the downlink CQI measurement section 203 receives the downlink RS signal $S_{DRSU}$ as input, calculates CQI on an RB-by-RB basis, and outputs it as downlink CQI information $S_{DCQB}$ (Step S11).

The downlink control signal separator 206 receives the mobile station receive signal $S_{RXU}$ as input, and separates therefrom PDCCH $S_{DCCU}$ in which downlink control signals from a plurality of mobile stations are multiplexed; the downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a reproduced downlink control signal $S_{DCMU}$ (Step S12).

The downlink control signal demodulator 207 receives the PBCH as input, demodulates it to reproduce a higher-layer control signal, separates therefrom a result of reproduction in which mobile station identification information corresponding to the mobile station itself is multiplexed, recognizes the number of PDCCH's destined to the mobile station itself from the number of frequency blocks in the reproduced higher-layer control signal, and when the number of demodulated PDCCH's destined to the mobile station itself reaches a number equal to the number of frequency blocks, terminates demodulation of PDCCH (Step S20).

The downlink scheduling information extracting section 208 receives the reproduced downlink control signal $S_{DCMU}$ as input, extracts therefrom downlink RB allocation decision information $S_{DSCU}$ corresponding to downlink resource allocation information, and outputs it (Step S13).

The uplink scheduling information extracting section 210 extracts, from the reproduced downlink control signal $S_{DCMU}$, UL Scheduling Grant, which represents information on allocated uplink RBs, and checks the value of the allocation resolution (Step S22).

Next, it discriminates a tree structure in the Tree-Based method from the value of the allocation resolution, identifies RBs indicated by the uplink RB allocation information in this tree structure, and outputs it as uplink RB allocation decision information $S_{USCU}$ (Step S14-1).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S15).

The uplink RS signal generator 212 receives the uplink RB allocation decision information $S_{USCU}$ as input, generates an uplink RS transmit signal $S_{URSU}$ using a resource for RS predetermined in the uplink RB allocation decision information $S_{USCU}$, and outputs it (Step S16).

The uplink data signal generator 213 receives the uplink RB allocation decision information $S_{USCU}$ as input, generates Physical Uplink Shared Channel (PUSCH) $S_{UDCU}$ using a resource for a data signal predetermined in the uplink RB allocation decision information $S_{USCU}$, and outputs it (Step S17).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a multiplexed mobile station signal $S_{MUXU}$; the transmitter 215 transmits the mobile station transmit signal $S_{MUXU}$ to the base station 100 (Step S18).

While the description has been made in the above-described embodiment using a configuration in which a number of frequency blocks is determined from a condition of mobile station's channel quality and an allocation resolution is set in accordance with the frequency blocks, the configuration may be one such that the allocation resolution is set in accordance with a condition of mobile station's channel quality. Moreover, in the above-described embodiment, the number of frequency blocks is described as being notified through Physical Downlink Control Channel (PDCCH), it is additionally notified with a higher-layer control signal mapped to PBCH (Physical Broadcast Channel), PDSCH (Physical Downlink Shared Channel), which is also referred to as Dynamic BCH, or the like. In this case, the number of frequency blocks $S_{UDFB}$ is input to a PBCH generator or PDSCH generator (both not shown) provided in the downlink control signal generator 111 in the base station, and is notified to a mobile station through the PBCH or PDSCH. Furthermore, since information on the uplink and downlink control signals varies from frame to frame in about 1 msec, there arises a problem that processing in a terminal becomes complicated in a case that the allocation resolution is modified with such a variation. Thus, additional limitation may be posed to modify the allocation resolution in a cycle of a plurality of frames.

Moreover, while the description has been made in the above-described embodiment using a configuration in which the allocation resolution is determined in accordance with the frequency blocks, the configuration may be one such that it is determined in accordance with a maximum number of frequency blocks, which is a maximum number of frequency blocks that can be allocated to one terminal.

Furthermore, while the description has been made in the above-described embodiment using a mode in which the uplink scheduler 104 allocates RBs with resource blocks in a number equal to the determined allocation resolution and with the determined number of frequency blocks in the embodiment, a mode may be contemplated in which RBs are allocated with resource blocks in a number equal to the determined allocation resolution and within the determined number of frequency blocks.

Moreover, while the description has been made in the above-described embodiment using a case in which the value of the allocation resolution is notified, a mode may be contemplated in which the value of the allocation resolution is not transmitted. In this case, a mobile station is configured to store a correspondence table as shown in FIG. 12, and recognize an allocation resolution using a received number of frequency blocks and the correspondence table.

The system band has been described as having 10 RBs for simplifying the explanation above; now an effect of reducing the number of bits in an actual LTE system having a system band of 20 MHz will be described. Similarly to the LTE downlink in which a plurality of frequency blocks can be allocated, on a presupposition that the number of signaling bits for use in resource allocation for one user in a system band of 20 MHz (the number of RBs=100) is 37, it is possible to hold the number of signaling bits for a number of frequency blocks of four or smaller down to 35 bits, including notification of an allocation resolution (two bits), which is less than 37 bits, by using a relationship between the number of frequency blocks and allocation resolution as in FIG. 12. FIG. 20 shows a number of bits required to notify RB patterns for frequency blocks in a number equal to the number of frequency blocks using the Tree-Based method, for numbers of frequency blocks of 1-4, respectively.

As described above, the number of frequency blocks for a mobile station with good channel quality is increased, while that for a mobile station with poor channel quality is decreased, and an allocation resolution is determined accordingly. This is because a mobile station with good channel quality performs transmission with a lower electric power density, and hence, with a broader band, and since the channel quality is good as a whole, the quality will not be degraded even when the allocation resolution is increased with the number of frequency blocks. On the other hand, a mobile station with poor channel quality performs transmission with a higher electric power density, and hence, with a narrower band, and since the channel quality is poor as a whole, the allocation resolution must be reduced with the number of frequency blocks in order to accurately select better resources from among all. Thus, by correlating the allocation resolution, number of frequency blocks and channel quality of a mobile station with one another, degradation in reception property due to setting of an allocation resolution may be reduced.

While a mode in which uplink resource blocks are allocated has been described in the embodiments above, the mode may be one such that downlink resource blocks are allocated. In such a case, the number of frequency blocks or maximum number of frequency blocks may be information varying in accordance with a communication environment, such as, for example, the cell size, system bandwidth, coverage of a base station, channel quality information measured by a downlink reference signal, bandwidth of downlink data signals, and number of levels in multi-level modulation for downlink data signals, or code rate. Moreover, since the aforementioned cell size is determined by information affecting the communication environment such as the position of a base station, distance between base stations, and interference power, the number of frequency blocks may be selected using such information.

Furthermore, a mode in which the mode of allocating uplink resource blocks is combined for execution with the mode of allocating downlink resource blocks may be contemplated.

In addition, while it is possible to configure the mobile station and the base station in the present invention described above by hardware, they may be implemented by a computer program as obvious from the preceding description.

A processor operated by programs stored in a program memory implements functions and operations similar to those in the embodiments described above. It should be noted that part of functions of the embodiments described above may be implemented by a computer program.

While the present invention has been described with reference to several embodiments, it is not limited thereto. Various modifications that those skilled in the art can appreciate may be made to the configuration or details of the present invention within a scope of the present invention.

The present application claims priority based on Japanese Patent Application No. 2008-161753 filed on Jun. 20, 2008, disclosure of which is incorporated herein in its entirety.

What is claimed is:

1. A method comprising:
transmitting, by a base station, a downlink control signal, the downlink control signal including resource allocation type information and uplink resource allocation information,
the resource allocation type information indicating one of:
a first uplink resource allocation type for allocating a set of contiguously allocated resource blocks, and
a second uplink resource allocation type for allocating a plurality of sets of resource blocks with each set including a plurality of consecutive resource blocks,
the uplink resource allocation information indicating one of:
first uplink resource allocation information indicating the set of contiguously allocated resource blocks if the resource allocation type information indicates the first uplink resource allocation type, and
second uplink resource allocation information indicating the plurality of sets of resource blocks if the resource allocation type information indicates the second uplink resource allocation type;
receiving, by the base station, first uplink data using the set of contiguously allocated resource blocks if the resource allocation type information indicates the first uplink resource allocation type; and
receiving, by the base station, second uplink data using the plurality of sets of resource blocks if the resource allocation type information indicates the second uplink resource allocation type,
wherein the set of contiguously allocated resource blocks includes one or more consecutive resource blocks,
wherein an allocation unit of the set of contiguously allocated resource blocks is smaller than an allocation unit of each one of the plurality of sets of resource blocks, and
wherein a resource block, which is not included in the plurality of sets of resource blocks, is located between each two of the plurality of sets of resource blocks.

2. The method according to claim 1,
wherein a length of the set contiguously allocated resource blocks is the one or more resource blocks.

3. The method according to claim 1,
wherein the allocation unit of each one of the plurality of sets of resource blocks is determined based on a system bandwidth.

4. The method according to claim 1,
wherein the allocation unit of the set of contiguously allocated resource blocks is one resource block, and
wherein the allocation unit of each one of the plurality of sets of resource blocks is a plurality of resource blocks.

5. The method according to claim 1,
wherein a number of resource blocks included in a first set of the plurality of sets of resource blocks is equal to a number of resource blocks included in a second set of the plurality of sets of resource blocks.

6. The method according to claim 1,
wherein a number of resource blocks included in a first set of the plurality of sets of resource blocks is different from a number of resource blocks included in a second set of the plurality of sets of resource blocks.

7. A method comprising:
receiving, by a mobile station, a downlink control signal, the downlink control signal including resource allocation type information and uplink resource allocation information, the resource allocation type information indicating one of:
a first uplink resource allocation type for allocating a set of contiguously allocated resource blocks, and
a second uplink resource allocation type for allocating a plurality of sets of resource blocks with each set including a plurality of consecutive resource blocks,
the uplink resource allocation information indicating one of:
first uplink resource allocation information indicating the set of contiguously allocated resource blocks if the resource allocation type information indicates the first uplink resource allocation type, and
second uplink resource allocation information indicating the plurality of sets of resource blocks if the resource allocation type information indicates the second uplink resource allocation type;
transmitting, by the mobile station, first uplink data using the set of contiguously allocated resource blocks if the resource allocation type information indicates the first uplink resource allocation type; and
transmitting, by the mobile station, second uplink data using the plurality of sets of resource blocks if the resource allocation type information indicates the second uplink resource allocation type,
wherein the set of contiguously allocated resource blocks includes one or more consecutive resource blocks,
wherein an allocation unit of the set of contiguously allocated resource blocks is smaller than an allocation unit of each one of the plurality of sets of resource blocks, and
wherein a resource block, which is not included in the plurality of sets of resource blocks, is located between each two of the plurality of sets of resource blocks.

8. The method according to claim 7,
wherein a length of the set contiguously allocated resource blocks is the one or more resource blocks.

9. The method according to claim 7,
wherein the allocation unit of each one of the plurality of sets of resource blocks is determined based on a system bandwidth.

10. The method according to claim 7,
wherein the allocation unit of the set of contiguously allocated resource blocks is one resource block, and
wherein the allocation unit of each one of the plurality of sets of resource blocks is a plurality of resource blocks.

11. The method according to claim 7,
wherein a number of resource blocks included in a first set of the plurality of sets of resource blocks is equal to a number of resource blocks included in a second set of the plurality of sets of resource blocks.

12. The method according to claim 7,
wherein a number of resource blocks included in a first set of the plurality of sets of resource blocks is different from a number of resource blocks included in a second set of the plurality of sets of resource blocks.

13. A base station comprising:
a transmitter configured to transmit a downlink control signal,
the downlink control signal including resource allocation type information and uplink resource allocation information,
the resource allocation type information indicating one of:
a first uplink resource allocation type for allocating a set of contiguously allocated resource blocks, and
a second uplink resource allocation type for allocating a plurality of sets of resource blocks with each set including a plurality of consecutive resource blocks,
the uplink resource allocation information indicating one of:
first uplink resource allocation information indicating the set of contiguously allocated resource blocks if the resource allocation type information indicates the first uplink resource allocation type, and
second uplink resource allocation information indicating the plurality of sets of resource blocks if the resource allocation type information indicates the second uplink resource allocation type; and
a receiver configured to receive first uplink data using the set of contiguously allocated resource blocks if the resource allocation type information indicates the first uplink resource allocation type,
wherein the receiver is configured to receive second uplink data using the plurality of sets of resource blocks if the resource allocation type information indicates the second uplink resource allocation type,
wherein the set of contiguously allocated resource blocks includes one or more consecutive resource blocks,
wherein an allocation unit of the set of contiguously allocated resource blocks is smaller than an allocation unit of each one of the plurality of sets of resource blocks, and
wherein a resource block, which is not included in the plurality of sets of resource blocks, is located between each two of the plurality of sets of resource blocks.

14. The base station according to claim 13,
wherein a length of the set contiguously allocated resource blocks is the one or more resource blocks.

15. The base station according to claim 13,
wherein the allocation unit of each one of the plurality of sets of resource blocks is determined based on a system bandwidth.

16. The base station according to claim 13,
wherein the allocation unit of the set of contiguously allocated resource blocks is one resource block, and
wherein the allocation unit of each one of the plurality of sets of resource blocks is a plurality of resource blocks.

17. The base station according to claim 13,
wherein a number of resource blocks included in a first set of the plurality of sets of resource blocks is equal to a number of resource blocks included in a second set of the plurality of sets of resource blocks.

18. The base station according to claim 13,
wherein a number of resource blocks included in a first set of the plurality of sets of resource blocks is different from a number of resource blocks included in a second set of the plurality of sets of resource blocks.

19. A mobile station comprising:
a receiver configured to receive a downlink control signal,
the downlink control signal including resource allocation type information and uplink resource allocation information,
the resource allocation type information indicating one of:
a first uplink resource allocation type for allocating a set of contiguously allocated resource blocks, and
a second uplink resource allocation type for allocating a plurality of sets of resource blocks with each set including a plurality of consecutive resource blocks,
the uplink resource allocation information indicating one of:
first uplink resource allocation information indicating the set of contiguously allocated resource blocks if the resource allocation type information indicates the first uplink resource allocation type, and second uplink resource allocation information indicating the plurality of sets of resource blocks if the resource allocation type information indicates the second uplink resource allocation type; and a transmitter configured to transmit first uplink data using the set of contiguously allocated resource blocks if the resource allocation type information indicates the first uplink resource allocation type, wherein the transmitter is configured to transmit second uplink data using the plurality of sets of resource blocks if the resource allocation type information indicates the second uplink resource allocation type, wherein the set of contiguously allocated resource blocks includes one or more consecutive resource blocks, wherein an allocation unit of the set of contiguously allocated resource blocks is smaller than an allocation unit of each one of the plurality of sets of resource blocks, and wherein a resource block, which is not included in the plurality of sets of resource blocks, is located between each two of the plurality of sets of resource blocks.

20. The mobile station according to claim 19, wherein a length of the set contiguously allocated resource blocks is the one or more resource blocks.

21. The mobile station according to claim 19, wherein the allocation unit of each one of the plurality of sets of resource blocks is determined based on a system bandwidth.

22. The mobile station according to claim 19, wherein the allocation unit of the set of contiguously allocated resource blocks is one resource block, and wherein the allocation unit of each one of the plurality of sets of resource blocks is a plurality of resource blocks.

23. The mobile station according to claim 19, wherein a number of resource blocks included in a first set of the plurality of sets of resource blocks is equal to a number of resource blocks included in a second set of the plurality of sets of resource blocks.

24. The mobile station according to claim 19, wherein a number of resource blocks included in a first set of the plurality of sets of resource blocks is different from a number of resource blocks included in a second set of the plurality of sets of resource blocks.

* * * * *